United States Patent
Vonsik et al.

(10) Patent No.: US 10,884,525 B1
(45) Date of Patent: Jan. 5, 2021

(54) INTERACTIVE MIXED MASKING SYSTEM, METHOD AND COMPUTER PROGRAM PRODUCT FOR A SIMULATOR

(71) Applicant: LOCKHEED MARTIN CORPORATION, Bethesda, MD (US)

(72) Inventors: Brett A. Vonsik, Orlando, FL (US); Howell B. Hollis, Orlando, FL (US); Brittany V. Henthorn, Orlando, FL (US); Joshua D. Kitain, Orlando, FL (US); Shawn M. Muir, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/391,440

(22) Filed: Apr. 23, 2019

(51) Int. Cl.
| | | |
|---|---|---|
| *G06F 3/041* | (2006.01) | |
| *H04N 9/75* | (2006.01) | |
| *G06F 3/01* | (2006.01) | |
| *G06T 19/00* | (2011.01) | |
| *G02B 27/00* | (2006.01) | |
| *G02B 27/01* | (2006.01) | |

(52) U.S. Cl.
CPC ......... *G06F 3/041* (2013.01); *G02B 27/0093* (2013.01); *G02B 27/0172* (2013.01); *G06F 3/012* (2013.01); *G06F 3/016* (2013.01); *G06F 3/017* (2013.01); *G06T 19/006* (2013.01); *H04N 9/75* (2013.01); *G02B 2027/0138* (2013.01); *G02B 2027/0178* (2013.01)

(58) Field of Classification Search
USPC ......... 345/173, 473, 419, 8, 174; 348/14.01; 434/16
See application file for complete search history.

(56) References Cited

U.S. PATENT DOCUMENTS

| | | | |
|---|---|---|---|
| 5,388,990 | A | 2/1995 | Beckman |
| 7,024,054 | B2 | 4/2006 | Cahill et al. |
| 7,212,687 | B2 | 5/2007 | Ohshima |
| 7,574,070 | B2 | 8/2009 | Tanimura et al. |
| 9,449,394 | B2 | 9/2016 | Shoji |
| 9,581,819 | B1 | 2/2017 | Boggs et al. |

(Continued)

FOREIGN PATENT DOCUMENTS

| | | |
|---|---|---|
| WO | 2014035118 | 3/2014 |
| WO | 2017177006 | 10/2017 |

*Primary Examiner* — Thuy N Pardo
(74) *Attorney, Agent, or Firm* — Foley & Lardner LLP

(57) ABSTRACT

A system comprising a device including a chromakeyed tactile touch-sensitive surface (TTSS) and touch-sensitive input (TSI) circuit to sense touch applied to the TTSS by a hand. A processor registers a location of a chromakey mask, the device, and a virtual portal location within a virtual reality (VR) scene including virtual pixels of virtual user-interactive simulator (VUIS) controls. The processor detects and isolates, within the mask, first pixels having a non-chromakey color overlapping the chromakey mask and second pixels matching a color of the chromakey mask. The first pixels are preserved to form a pass-through image. A composite mixed reality scene is formed with the VR scene and preserved pixels registered to the VR scene. Those VUIS controls corresponding to the preserved pixels are omitted from the VR scene and remaining virtual pixels of the VUIS controls overlap and link to the TSI circuit.

20 Claims, 15 Drawing Sheets

(56) References Cited

U.S. PATENT DOCUMENTS

| | | | | |
|---|---|---|---|---|
| 10,127,724 B2* | 11/2018 | Carre | | H04N 21/443 |
| | | | | 345/173 |
| 2005/0151743 A1* | 7/2005 | Sitrick | | G09G 5/377 |
| | | | | 345/473 |
| 2010/0182340 A1 | 7/2010 | Bachelder et al. | | |
| 2012/0069131 A1* | 3/2012 | Abelow | | G06Q 10/067 |
| | | | | 348/14.01 |
| 2015/0054823 A1* | 2/2015 | Dzhurinskiy | | H04N 5/2226 |
| | | | | 345/419 |
| 2015/0091891 A1* | 4/2015 | Raheman | | G06F 3/017 |
| | | | | 345/419 |
| 2015/0260474 A1* | 9/2015 | Rublowsky | | A63F 13/213 |
| | | | | 434/16 |
| 2015/0348329 A1* | 12/2015 | Carre | | G06F 16/9554 |
| | | | | 345/633 |
| 2016/0034037 A1 | 2/2016 | Leng | | |
| 2020/0252593 A1* | 8/2020 | Chapdelaine-Couture | | |
| | | | | H04N 9/75 |
| | | | | 345/8 |

* cited by examiner

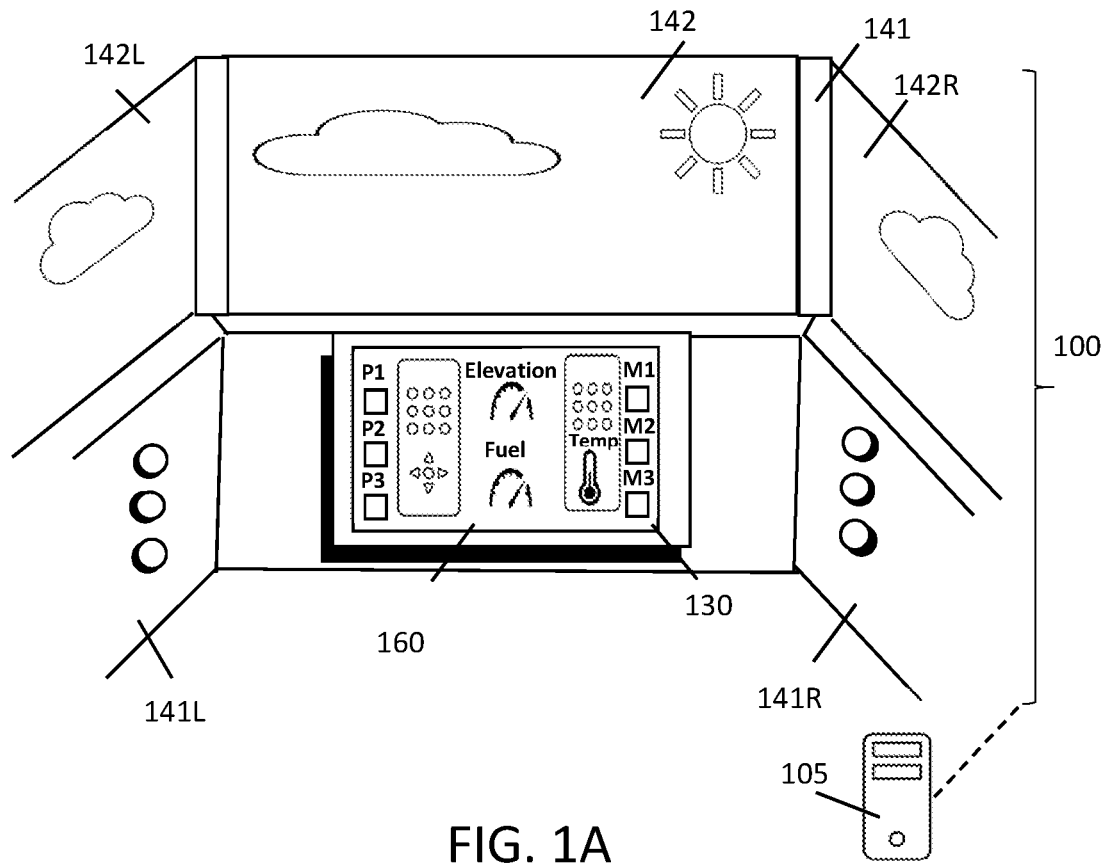
FIG. 1A
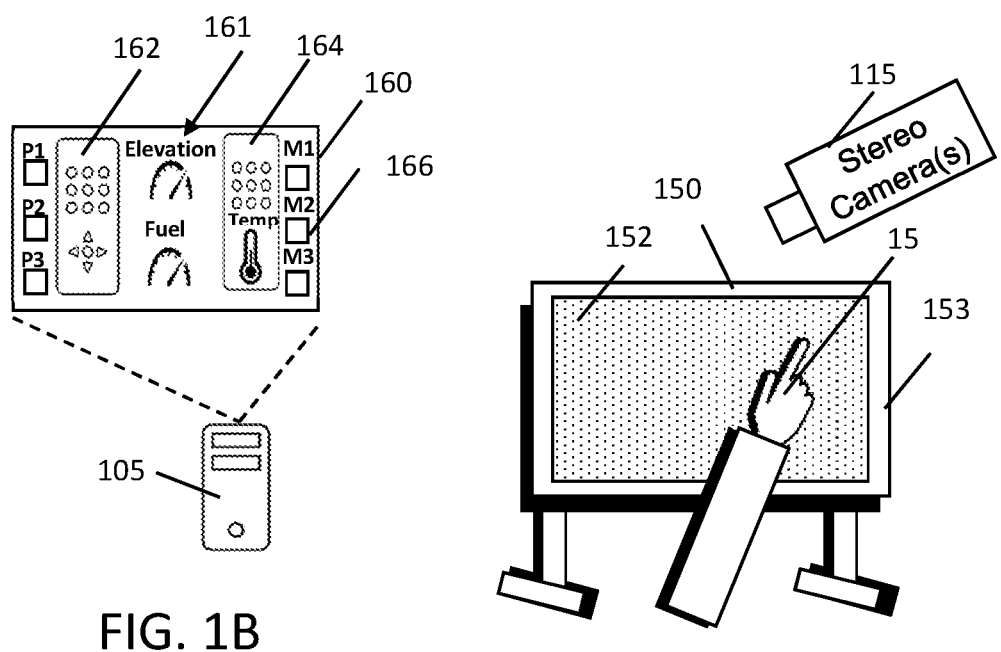
FIG. 1B
FIG. 1C

448

450
Controlling, by at least one processor, a device, which includes a tactile touch sensitive surface (TTSS) and a touch-sensitive input (TSI) circuit configured to sense a touch applied to the TTSS by a user's hand at a location on the TTSS, to cause pixels of the TTSS to, during a simulation, display a non-simulated chromakey mask and to map the pixels of the chromakey mask to the TSI circuit and to virtual user-interactive simulator (VUIS) controls associated with the simulation 452
Detecting, by the at least one processor, pixels of the user's hand and the pixels of the chromakey mask in a captured frame image of an ambient environment during the simulation 454
Rendering, by at least one processor, a virtual reality (VR) scene 456
Rendering first VR pixels representative of the VUIS controls overlaid on and aligned with the detected pixels of the chromakey mask in the captured frame image 458
Skip rendering second VR pixels representative of a hand mask which overlap and align with detected pixels of the user's hand overlapping a portion of the chromakey mask in the captured frame image 460
Rendering third VR pixels representative of a simulator cockpit chassis with at least one window of a vehicle 462
Rendering fourth VR pixels representative of at least one out-the-window (OTW) scene mapped to the at least one window of the vehicle

INTERACTIVE MIXED MASKING SYSTEM, METHOD AND COMPUTER PROGRAM PRODUCT FOR A SIMULATOR

BACKGROUND

Embodiments relate to interactive mixed masking system, method and computer program product for a simulator.

Commercial simulators, such as flight or ground simulators, are relatively large systems that require a substantial amount of space at a large cost. Flight or ground simulators, for example, are moving towards mixed-reality, by leveraging stereo red, green, blue (RGB) cameras for video pass-through for the user to see their own real hands and real controls with the real text on the controls or multi-function displays on touchscreen display devices, while seeing the virtual out-the-window (OTW) imagery of a training simulation.

Most mixed-reality systems use a video camera feed to simply display a video capture of the video camera feed in a head-mounted display (HMD) apparatus, resulting in reduced resolution and adding more latency to the simulation computing system. The appearance of the real text can be affected as the HMD apparatus's cameras do not capture the real text in the environment with high enough resolution to be able to properly process the real text in the captured video images at a viable resolution threshold. The video captured real text in the environment of each frame is processed from the perspective of the user. However, the real text on the controls or touchscreen displays seen through the cameras from the perspective of the user, may not be readable by the user in an immersive HMD apparatus, thus diminishing the usefulness of the simulation training.

SUMMARY

Embodiments relate to interactive mixed masking system, method and computer program product for a simulator system.

An aspect of the embodiments includes a system comprising a device including a chromakeyed tactile touch-sensitive surface (TTSS) and a touch-sensitive input (TSI) circuit configured to sense a touch applied to the TTSS by at least one user's hand at a location on the TTSS. The chromakeyed TTSS being chromakeyed by a non-simulated chromakey mask. The system includes at least one processor configured to execute a program code stored in a tangible, non-transitory memory to cause the at least one processor to: register a location of the chromakey mask, the device in a frame image of an ambient environment, and a virtual portal location within a virtual reality (VR) scene including virtual pixels of virtual user-interactive simulator (VUIS) controls; detect and isolate within the chromakey mask, in a current frame image of the ambient environment, first pixels having a non-chromakey color overlapping a portion of the chromakey mask and second pixels matching a chromakey color of the chromakey mask; preserve the first pixels in the current frame image to form a camera pass-through image; and form a composite mixed reality scene with the VR scene and the preserved pixels in the pass-through image registered to the VR scene, wherein those virtual pixels of the VUIS controls corresponding to the preserved pixels being omitted from the VR scene and remaining virtual pixels of the VUIS controls overlap and link to the TSI circuit in the ambient environment.

Another aspect of the embodiments includes a tangible, non-transitory computer readable media having program instructions stored thereon which when executed causes at least one processor to: register a location of a non-simulated chromakey mask, a user touch input device in a frame image of an ambient environment, and a virtual portal location within a virtual reality (VR) scene including virtual pixels of virtual user-interactive simulator (VUIS) controls; detect and isolate within the chromakey mask, in a current frame image of the ambient environment, first pixels having a non-chromakey color overlapping a portion of the chromakey mask and second pixels matching a chromakey color of the chromakey mask; preserve the first pixels in the current frame image to form a camera pass-through image; and form a composite mixed reality scene with the VR scene and the preserved pixels in the pass-through image registered to the VR scene, wherein those virtual pixels of the VUIS controls corresponding to the preserved pixels being omitted from the VR scene and remaining virtual pixels of the VUIS controls overlap and link to the user touch input device in the ambient environment.

Another aspect of the embodiments includes a method comprising capturing, by at least one camera, a frame image of an ambient environment; and registering, by at least one processor, a location of a non-simulated chromakey mask, a user touch input device in the frame image of the ambient environment, and a virtual portal location within a virtual reality (VR) scene including virtual pixels of virtual user-interactive simulator (VUIS) controls. The method includes detecting and isolating, by the at least one processor, within the chromakey mask in a current frame image of the ambient environment, first pixels having a non-chromakey color overlapping a portion of the chromakey mask and second pixels matching a chromakey color of the chromakey mask; and preserving, by the at least one processor, the first pixels in the current frame image to form a camera pass-through image. The method includes forming, by the at least one processor, a composite mixed reality scene with the VR scene and the preserved pixels in the pass-through image registered to the VR scene. Those virtual pixels of the VUIS controls corresponding to the preserved pixels are omitted from the VR scene and remaining virtual pixels of the VUIS controls overlap and link to the user touch input device in the ambient environment.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1A illustrates pixel content of a virtual-reality computer-generated scene image;

FIG. 1B illustrates a portion of the virtual-reality computer-generated image of FIG. 1A representative of pixel content of a virtual interactive panel (VIP) overlay;

FIG. 1C illustrates a chromakeyed touch-sensitive surface for use in the creation of a mixed-reality scene with a user's hand being captured in front of the chromakeyed touch-sensitive surface;

FIG. 4B illustrates a flowchart of a method of interactive mixed masking (IMM);

DETAILED DESCRIPTION

Figure 1D:
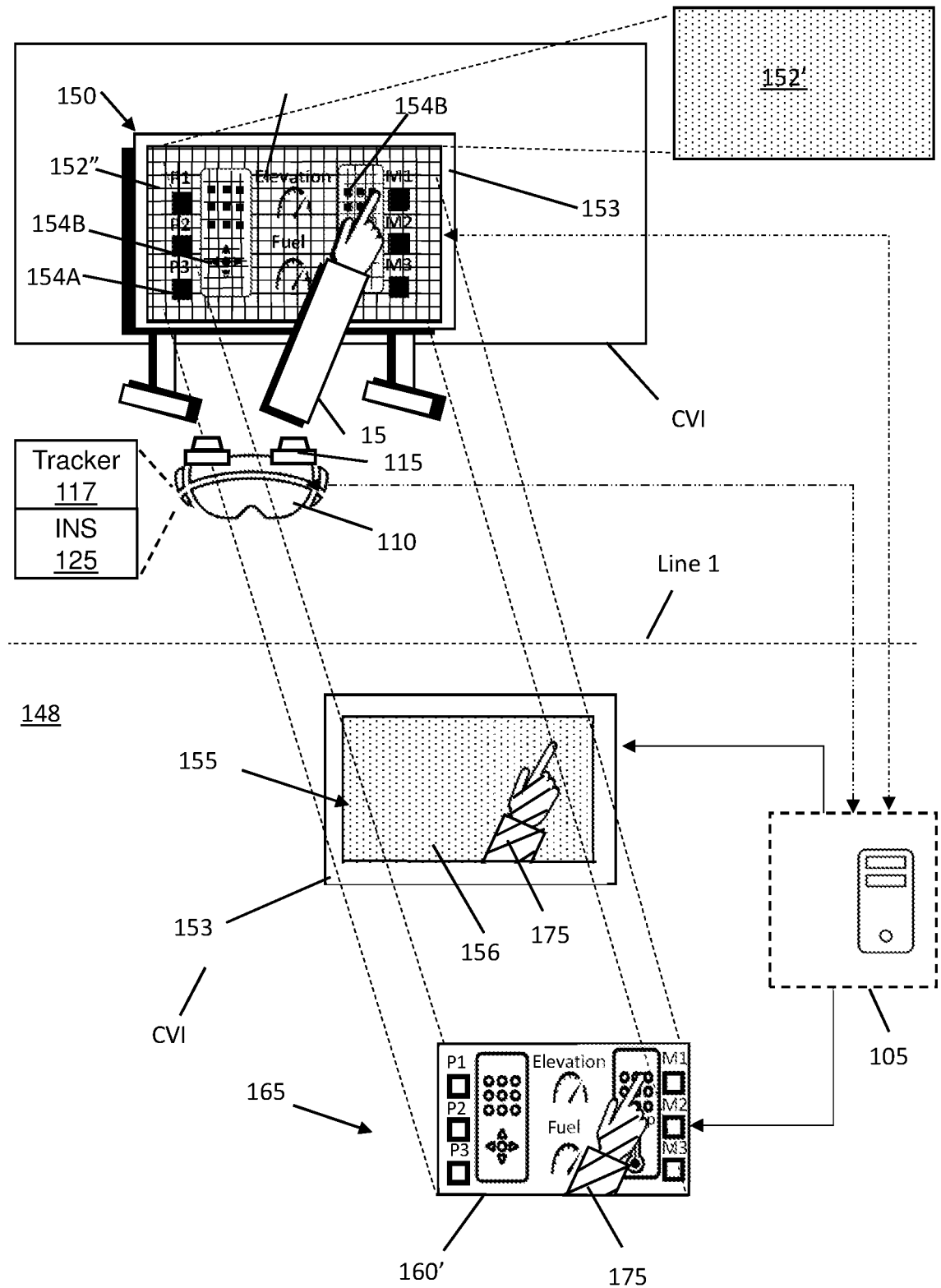
FIG. 1D illustrates an interactive mixed masking system for use in a simulator.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The embodiments herein may provide solutions for mixed-reality environments in simulation, such as without limitation, for automated cockpit control identification using synthetic machine vision; a dome-less simulator; and the other vehicle simulators using head mounted display (HMD) apparatuses and/or multi-function display (MFD) devices to control features or motion of a simulated vehicle. A simulated vehicle may include air-borne vehicles, ground vehicles, sea-borne vehicles, spacecraft vehicles, etc. In some embodiments, the interactive mixed masking (IMM) system described herein may be used in a dome simulator.

The embodiments herein may use geometry-based masking, chromakey-based masking, and/or virtual hand tracking for creating a composite mixed-reality (MR) final scene using an interactive mixed masking (IMM) processes to register a simulated instrumentation panel to a (non-simulated) tactile touch-sensitive surface (TTSS) or touchscreen to form a mixed-reality (MR) instrumentation panel simulator device. The MR instrumentation panel simulator device includes a simulated/virtual instrumentation panel overlay mapped to a touch-sensitive circuit of the non-simulated TTSS in the ambient environment. The TTSS is a MR instrumentation panel simulator device since itself is implemented in mixed reality for interacting with the simulation using the TTSS while providing virtual-reality (VR) text overlaid on the TTSS with a high resolution. The VR text may be only viewable through the HMD apparatus even though the TTSS is in a field-of-view (FOV) of a camera device capturing a frame image.

The mixed-reality (MR) instrumentation panel simulator device provides the user a tactile user input interface (TUIT) having the natural/expected feel for the application of a touch by the user to interact and control a simulator using a composite mixed-reality scene registered to an interior surface of an HMD apparatus, in some embodiments. In other embodiments, the composite mixed-reality scene is displayed on display devices of an HMD apparatus, such as an immersive HMD apparatus, for near to the eye viewing by the user.

The interactive mixed masking (IMM) capability leverages a mixed-reality (MR) head mounted display (HMD) apparatus and may employ geometry-based masking and chromakey-based masking techniques to identify/register the real-world view to a virtual-reality (VR) environment displayed as a composite MR image on an HMD apparatus. The IMM capability may also simultaneously employ chromakey-based masking on a tactile touch-sensitive surface (TTSS) display device in the environment to effectively turn the TTSS display device to a chromakey color, such as green, to overlay a computer-generated image (CGI) representative of a virtual-reality (VR) instrumentation panel on a non-simulated chromakey mask in a composite MR scene image.

Some HMD apparatuses display only simulated (computer-generated) images, as opposed to real-world images, and accordingly are often referred to as "virtual-reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with pixel content of a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Combining a real-world view with a simulated image can also be done electronically by accepting video of a real-world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties. The embodiments herein may be adapted for use with other HMD apparatuses capable of mixed-reality imaging. In some embodiments, the simulator may employ an optical see-through system with adaptations to the environment.

The terms "camera image," "frame image" and "captured image" may all be used interchangeably herein to refer to a non-simulated image.

FIG. 1A illustrates pixel content of a virtual-reality computer-generated scene (VR-CGS) image 100. The VR-CGS image 100 may include virtual data representative of a single VR-CGS image of a simulation application stored in memory. The VR-CGS image 100 may be part of a plurality of VR-CGS images 100 which form a video of simulated images for gaming simulators, training simulators or other simulators, for example. The VR-CGS image 100 may be an initial virtual scene image used to create a final VR-CGS image 100", as will be described in relation to FIG. 1F. The VR-CGS image 100 depicted should not be limiting in any way but only used for the purpose of explaining the features of the simulation.

By way of non-limiting example, the VR-CGS image 100 may include virtual image data representative of an out-the-window (OTW) scene 142. The VR-CGS image 100 may include virtual image data representative of a cockpit framework image 141. In some embodiments, the virtual data representative of the OTW scene 142 is combined or integrated with data representative of the cockpit framework/chassis image 141 for a vehicle, such as an aircraft vehicle.

Figure 2:
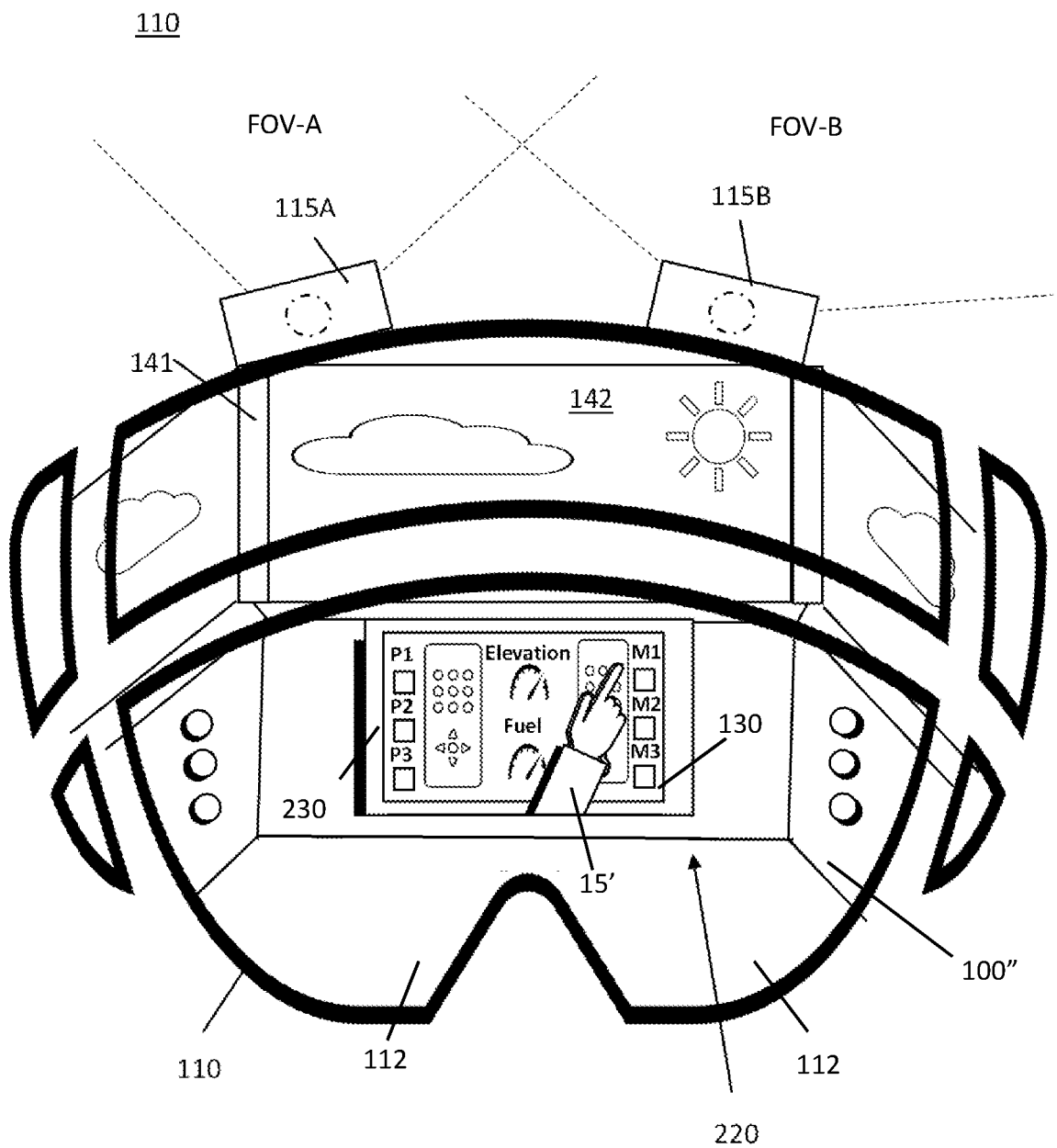
FIG. 2 illustrates a composite mixed-reality (MR) final scene displayed on lenses of a head-mounted display (HMD) apparatus of a simulation system.

The VR-CGS image 100 may include virtual data representative of a virtual interactive panel (VIP) overlay template 160. The VIP overlay template 160 is used to convert a TTSS to a mixed-reality (MR) instrumentation panel simulator device 230 (FIG. 2). The OTW scene 142 may change based on at least the simulated orientation (pitch, yaw, roll) and position (x, y, z coordinates) of the aircraft vehicle, for example, at any instant in time. The cockpit framework/chassis image (CFI) 141 of the vehicle may be varied based on a change in position of the user's head relative to the cockpit. The cockpit may include a simulated instrumentation compartment.

The VIP overlay template 160 of the VR-CGS image 100 may also be varied based on a change in the head or camera position relative to the virtual instrumentation panel device 130 and specifically, the MR instrumentation panel simulator device 230 (FIG. 2). Accordingly, the VR-CGS image 100 may be updated based on at least one of the OTW scene 142, the CFI 141 and the VIP overlay template 160 based collectively on at least one of a state of the video at a particular instantiation, the head of the user, location on a navigated path and/or orientation of the vehicle.

Furthermore, as will be evident from the description herein, the VIP overlay template 160 may be changed or updated based on the received user's interaction with the vehicle, during a simulation. The orientation (pitch, yaw, roll) associated with the aircraft vehicle, may also be changed based on the received user's interaction with the vehicle, during the simulation. Nonetheless, the orientation (pitch, yaw, roll) and the position (x, y, z coordinates) of the vehicle changes as the vehicle moves along a navigated path. Accordingly, the OTW scene 142 changes or is updated along the navigated path as the position of the vehicle changes.

While the description herein is directed to an aircraft vehicle, the embodiments herein are applicable to an VR-CGS image 100 for use with ground-vehicles wherein the cockpit framework image would be for an interior of a ground-vehicle. Likewise, the embodiments herein are applicable to an VR-CGS image 100 for use with watercraft vehicles, spacecraft vehicles, etc. wherein the cockpit framework image 141 would be substituted with a cockpit design of the particular type of vehicle. The embodiments herein have application for simulator simulating other machines that uses tactile user input devices. For example, a fast food employee or other employees may use a TTSS as part of their job function. The embodiments herein may train employees on the use of a TTSS as part of their job function or any other machine which incorporates a tactile touch-sensitive surface to operate any machine. Thus, the VR-CGS image 100 would be modified to include virtual-reality image data appropriate for the training.

In the embodiment of FIG. 1A, the VR-CGS image 100 may be represented in three-dimensional (3D) space. Thus, the OTW scene 142 may be positioned directly in front of the user's eyes. However, the OTW scene 142L corresponds to OTW scenes along a left sidewall 141L of the CFI 141. The OTW scene 142R corresponds to OTW scenes along a right sidewall 141R of the CFI 141. Generally, the CFI may be simulated to appear as surrounding the user on at least three side to form a virtual-reality enclosure resembling a simulated vehicle.

FIG. 1B illustrates a portion of the virtual-reality computer-generated image of FIG. 1A representative of the virtual interactive panel (VIP) overlay template 160. The VIP overlay template 160 may include pixel content of images of a plurality of virtual user-interactive simulator (VUIS) controls 162, 164 and 166, gauges and/or indicators 161 or a combination thereof. The training, simulation or gaming program may include a set of controls which when interacted with by the user using the TTSS would cause the simulation program to change at least the OTW scene 142 of the VR-CGS image 100, as will be discussed in more detail later. The training, simulation or gaming program may include a set of controls which when interacted with by the user would cause the simulation program to change readings on the gauges 161, indicators, or other instrumentation of VIP overlay template 160 and/or VR-CGS image 100. The term "template" is used herein to indicate a generally static format with simulated sensed data associated with gauges and/or indicators 161, for example, being configured to be updated in a next instance of the VR-CGS image 100 as would certain sensed data of the gauges and instrumentation of a real vehicle in operation.

By way of non-limiting example, the gauges 161, indicators, or instrumentation may include an elevation gauge, a fuel gauge and a temperature indicator. The gauges, indicators or instrumentation are for illustrative purposes and should not be limiting in any way. The VIP overlay template 160 may include other gauges and control buttons based on the type of aircraft vehicle. The gauges and control buttons may be labeled with a text field. For the sake of brevity, the specific gauges and controls of VIP overlay template 160 are for illustrative purposes only and not meant to be limiting in anyway. By way of non-limiting example, the text fields of the VIP overlay template 160 may include the words "Elevation," "M1," "M2," "M3," "Temp," "Fuel," "P1," "P2" and "P3."

FIG. 1C illustrates a chromakeyed tactile touch-sensitive surface (TTSS) 152 for use in the creation of a mixed-reality scene, as will be discussed in relation to FIG. 2. The chromakey mask displayed by the TTSS 152 is denoted as a dotted hatch pattern. In some embodiments, the composite mixed-reality scene (FIG. 2) may include pass-through camera images/video of a user's hand 15 or upper extremity captured in front of the chromakey TTSS 152, from at least one camera device 115. For the sake of description, the chromakey mask (dotted hatch pattern) may cover only the real estate of the tactile touch-sensitive surface 152 or may be expanded to include both the frame 153 and the TTSS 152 of the real touchscreen display device 150. The chromakey mask may define a boundary from which to initially limit the camera-view image for the pass-through camera image.

The TTSS 152 may be part of a real touchscreen display device 150. The display device 150 may be integrated into a computing system, an All-In-One Desktop computing system, Tablet, iPAD, etc. The display device 150 may include a liquid crystal display (LCD) or light emitting diode (LED) touchscreen surface. The LED touchscreen surface may be an organic light emitting diode (OLED) or a transparent OLED, by way of non-limiting example. The TTSS 152, in a normal mode of operation, when touched by a user through interaction with a displayed icon, keyboard, control buttons or tabs causes the computing system to respond to such user interaction. However, in embodiments described herein, the TTSS 152, in a simulator mode, is chromakeyed with its touch-sensitivity grid or circuit mapped to the VIP overlay template 160 wherein the TTSS 152 may not display any icons, in some embodiments. The TTSS 152 is chromakeyed by the electronic display of a non-simulated chromakey mask, such as a chromakey identifying color. In other embodiments, the non-simulated chromakey mask may include a chromakey screen sheet (i.e., a non-simulated chromakey mask) adapted to cover at least the TTSS 152. The chromakey screen sheet would allow the touch-sensitive circuit mapped to the VIP overlay template 160 to sense the touch of a user through the chromakey screen sheet. In still further embodiments, a real touchscreen display device 150 and/or the TTSS 152 may be pre-colored to include a chromakey identifying color.

The virtual instrumentation panel device 130 is intended to be registered to and overlap with the TTSS 152 of the display device 150 so that as the user interacts with the TTSS 152, through mixed reality with the VIP overlay template 160 of the VR-CGS image 100 overlaid on the TTSS 152 as part of a composite MR scene seen through an HMD apparatus.

The embodiments herein will create a virtual touch-sensitive (VTS) grid which is mapped to the tactile touch-sensitive surface (TTSS) grid 152" (FIG. 1D) of the chromakeyed TTSS 152 within the camera-view image. In other words, the TTSS 152 displays essentially a single color without the display of designated icons, application tool bars, simulator tool bars, etc. However, the touch-sensitive circuit embedded in the TTSS 152 is mapped to the VTS grid of the VIP overlay template 160 so that the VIP overlay template 160 may appear as being displayed by the TTSS 152 but has a higher resolution than the resolution of camera-view image.

The real TTSS grid 152" is programmed to correspond to the virtual control buttons 154A labeled by text fields P1, P2, P3, M1, M2, and M3 of the VIP overlay template 160, for example, not actually displayed by the TTSS 152 of the display device 150. The virtual control buttons may also include additional virtual control buttons 154B associated with the VIP overlay template 160. The TTSS grid 152" is intended to also represent the touch-sensitive circuit. The touch-sensitive circuit may be inductive to sense inductive changes or capacitive to detect capacitive changes in the event a finger touches the touch-sensitive surface 152. Nonetheless, other touch-sensitive circuits may be used which are well known in the art.

In some embodiments, the display device 150 may be a multi-functional display (MFD) device such that the touch-sensitive circuit (i.e., TTSS grid 152") may be able to detect at least two touches (user inputs) simultaneously or nearly simultaneously. Each touch sensed by a touch sensor(s) may cause a different control input to be registered. By way of non-limiting example, a single display device 150 may be used simultaneously by two users, such as a pilot and co-pilot.

Because each environment is different, the factors affecting the quality of video-captured text, by a camera, as it appears in an image varies. These factors can affect the outcome of the simulation because of text imaged using a camera can have poor resolution or quality. Quality can be affected by the size of the displayed text on the TTSS. The quality of the text may vary based on the resolution of one of the TTSS and the camera device. Furthermore, the camera's image may be captured at a different lower resolution than the resolution capabilities of the touch-sensitive surface. In some embodiments, it may be desirable to capture video images at a lower resolution to increase the processing speed of the computer system used in the simulation. A reduced processing speed has benefits by leaving other resources free to display computer-generated (simulated) images at a higher resolution.

Other factors affecting the ability of a user to see displayed text may include lighting within the room in which the user sits during the simulation and size of the TTSS. The real text on a display screen captured by a camera may also be subject to shading, glare, lighting, blurring or other factors affecting imaging of real objects with a camera in an ambient environment.

The example text fields are arbitrary and represented as mapped to the grid of the TTSS (FIG. 1D). For example, some locations of text are on a part of the TTSS which does not cause a control in the simulation, if touched. Instead, certain grid fields are active controls which when touched would cause, in response, the simulation program script to alter the next set of a sequence of events (program code), for example. Thus, the entire touchscreen real estate may not be touch responsive based on non-interactive elements of the VIP overlay template 160. A sequence of events may cause a new instantiation of the VIP overlay template to reflect changes in at least one of the gauges, indicators and instrumentation for the instantiation of simulated operational parameters of the vehicle. In addition to changes to the VIP overlay template, the VR-CGS image 100 may also be updated, per the simulation.

Figure 3A:
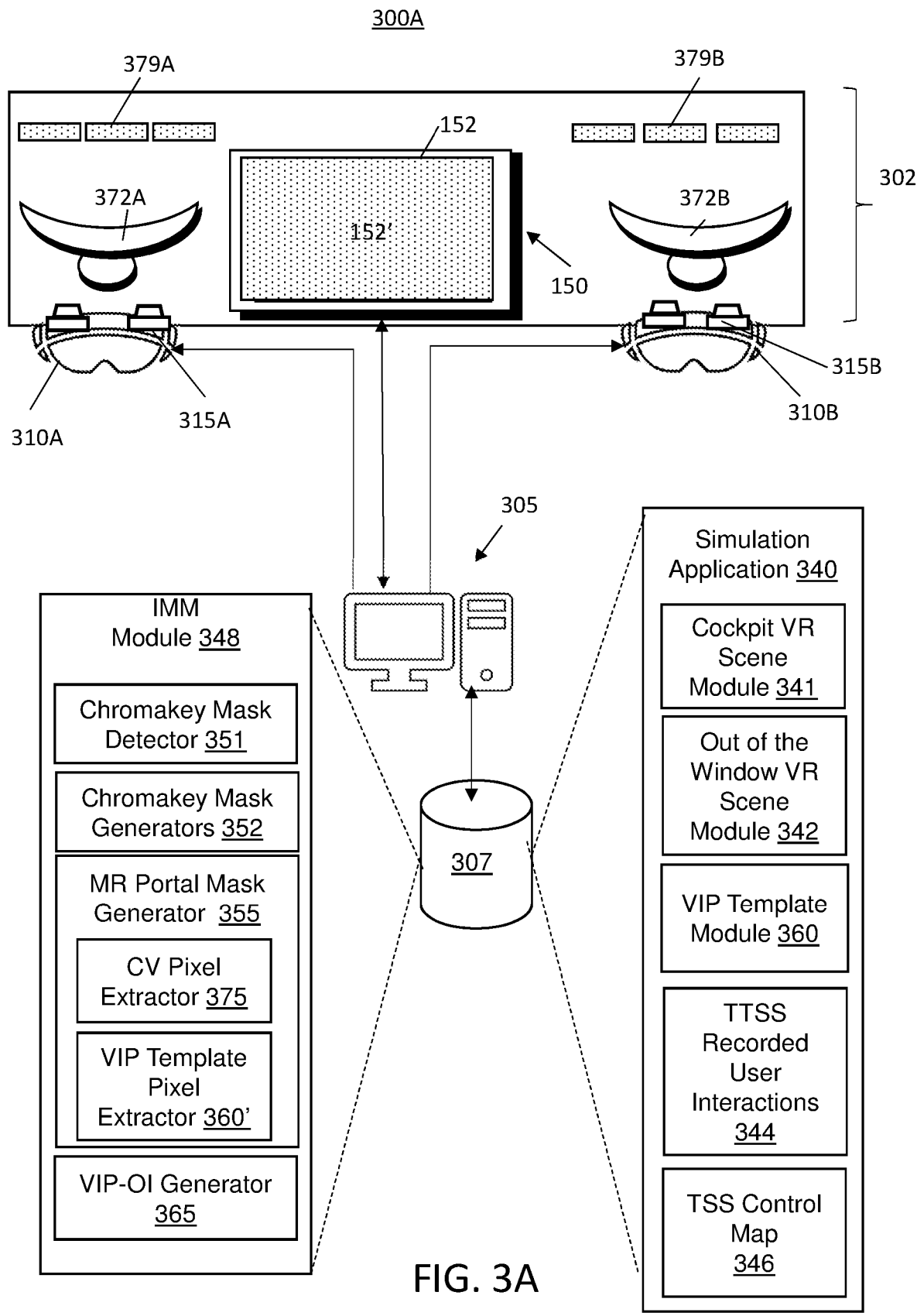
FIG. 3A illustrates an interactive simulation system.

A user's response time during a simulation may be an objective determined from the recorded user interactions 344 (FIG. 3A). However, the delay in the response time may be a result to the user struggling to read text.

FIG. 1D illustrates an interactive mixed masking (IMM) system 148. The interactive mixed masking system 148 may include computing system 105 having an IMM module 348, as will be described in more detail in relation to FIG. 3A. The IMM system 148 may be part of a simulation system 300A (FIG. 3A). The IMM system 148 may share one or more resources of the simulation system 300A, as will be evident based on the description herein. The IMM system 148 is represented in part below the dashed line, denoted as Line 1, but relies on the HMD apparatus 110 to register the TTSS 152 relative to the user in a computer-generated image of VR-CGS image 100 (FIG. 1A) and the VIP overlay template 160.

The IMM system 148 may control the TTSS 152 to be chromakeyed with a chromakey mask 152' of a particular chromakey color, in some embodiments. In other embodiments, the TTSS 152 may be pre-colored a chromakey color or a chromakey colored screen sheet may be placed over the TTSS 152, which are also representative of non-simulated masks. The IMM system 148 may detect the type of display device 150 to determine size of the display screen or TTSS of the display device 150.

By way of non-limiting example, the TTSS 152 may be controlled to display a chromakey color, such as without limitation, green, blue or red on the display screen. Other colors may be used. In some embodiments, different chromakey colors may be used simultaneously to distinguish different objects or different parts of the same object. In some embodiments, the display device 150 may be coupled to the computing system 105 through wireless or wired communication mechanisms. The communication connection from the computing system 105 to the display device 150 is denoted as a dash-dot line. The chromakey color being a non-simulated mask 152' of the IMM system 148. The non-simulated mask 152' is configured to identify in the real-world the location of a real or tactile touch-sensitive surface (TTSS) 152 for use by the user to interact with a tactile device, the use of which is readily known to many users. Hence, there is little need to train a user on how to actually interface with a simulation system.

The acts described in FIGS. 1A-1F are for a single display device 150 used in the simulation system. However, more than one display device 150 may arranged to include multiple functions of the instrumentation and controls of a vehicle or other simulated machine. The IMM system 148 described herein would be the same for all display devices or user interactive devices used in a simulation. As can be appreciated, the user has two hands, but only one shown. Hence, at least one hand mask may be created for chromakeyed tactile devices being used simultaneously at any instantiation. The hand mask is only generated when the user's hand overlaps the TTSS or other chromakeyed tactile device. With respect to FIG. 1D, assume that the box denoted as CVI represents the camera-view image CVI wherein everything in the camera-view image CVI is non-simulated and the hand/arm 15 is real.

The term "hand mask" is used as a metaphor for a camera-view mask. Thus, the term "hand mask" is interchangeable with a "camera-view mask." The hand mask is per-camera view and may include more than just the hand overlapping at least one chromakey mask. In this specific embodiment, a TTSS mask 160' may be generated based on the location of the isolated pixels 156 relative to the VIP overlay template 100. Those pixels of camera-view image associated with at least one hand or other object are excluded from this TTSS mask 160' since the colors of such pixels do not match the color of the non-simulated chromakey mask. The remaining virtual pixel area (i.e., virtual pixels 175) in the chromakey mask 152' corresponds to the location of the camera-view or hand mask 175. The hand mask 175 includes those pixel locations in the camera-view image aligned with the real hand/arm 15.

The IMM system 148 may discard those pixels in the camera-view image tested to have the chromakey color from the camera-view image data. These discarded pixels in the camera-view image are replaced with registered and aligned pixels of the TTSS mask 160'. Any pixels in the camera-view image that are tested to have a non-chromakey color and which overlap the non-simulated chromakey mask or portal mask are preserved in the camera-view image. Such preserved pixels are used as the basis of the video pass-through image. If the camera-view image includes pixels associated with the user's hand and arm outside of pixels in the chromakey mask boundary, then those pixels may also be discarded from the video pass-through image. The camera-view image is not limited to hands and arms but instead may include any object which overlaps the non-simulated chromakey mask. In other words, the video pass-through image will include the preserved pixels identified in a camera-view image, as will be discussed in more detail in FIG. 3B.

In FIG. 1C, the depiction of the TTSS 152 is in a state of displaying the chromakey mask 152', as shown in FIG. 1D. The TTSS grid 152" is a matrix of touch points registered to the TTSS 152 and being programmed to map to the VIP overlay template 160, denoted in a square hatch pattern overlaid on template 160. However, virtual control buttons of the VIP overlay template 160 are shown in black for illustrative purposes to distinguish VR text fields and gauges or instrumentation from the virtual control buttons. The mapped grid of the TTSS 152 when interacted with by an actual touch from the user may control the simulation operation of the vehicle. The virtual control buttons may be akin to icons for the sake of explanation.

The interactive mixed masking (IMM) system 148 may receive image data from at least one camera device 115 mounted to the HMD apparatus 110. The HMD apparatus 110 as part of the simulation system (FIG. 3A) may be configured to display on the HMD apparatus 110 the virtual-reality computer-generated scene (VR-CGS) image 100 (FIG. 1A) from the perspective of the user. However, when the user's hand intersects pixels in the VR-CGS image 100, a composite mixed-reality final scene 220 (FIG. 2) is generated in replacing certain pixels of the VR-CGS image 100 with pixels of a camera-view or hand mask 175 so that the user's hand captured in real-time can be seen as a pass-through image of camera device 115. While the description herein describes the replacement of pixels in the VIP overlay template 160 of VR-CGS image 100, other pixels of the VR-CGS image 100 may not be replaced with any camera-view image pixels which intersect pixels of the VR-CGS image 100 and identified as being outside of the VIP overlay template 160 and/or at least one of the portal mask and the non-simulated chromakey mask.

No hand tracking or image detection of the hands needs to be performed. The embodiments use a green screen or chromakey techniques to marry an interactive virtual-to-real portal to a real-to-virtual portal using the same camera-view. The virtual-to-real portal and a real-to-virtual portal overlap. These techniques include a camera-view masking process to identify pixel locations in a camera-view image not having a chromakey color and extract those identified pixels for use as a video pass-through image of the real-world view used in a composite mixed-reality final scene. These techniques use the same camera-view image for a TTSS masking process to identify those pixels having the chromakey color over the TTSS to map corresponding pixels of the VIP overlay template 160' (FIG. 1D) to the touch-sensitive circuit of the TTSS.

While the views of FIGS. 1A-1F use a single chromakey mask in the camera-view image, the camera-view image may include other chromakey masks of the same color or a different color. The simulation system may have a full green (chromakeyed) cockpit and/or green (chromakeyed) fabric dome around the user. This may allow the user to see up to their entire body, for example, and not just their hand(s).

The VR-CGS image 100 or portions thereof are generated relative to the position of the user's head as detected by inertial navigational system (INS) 125 associated with the HMD apparatus 110. The INS 125 may include accelerometers and gyroscopes to sense data representative of a position and orientation of the user's head or the head-worn camera device 115. The INS 124 may include a global position system (GPS). The location tracker 117 may be configured to track a location and/or orientation of the user's head based on the sensed data by the INS 125. In other embodiments, the location tracker 117 may track a location and/or orientation of the at least one head-worn camera. In other embodiments, the tracker 117 may be configured to track the location and/or orientation of the head and/or the camera(s).

The at least one camera device 115 is configured to be a video pass-through camera device to capture a camera frame image of extremities such as hands and arms of the user moving in the field of view (FOV) of the at least one camera device 115 and the chromakeyed tactile touch-sensitive surface (TTSS) 152. The chromakeyed TTSS 152 displays a chromakey mask 152'. The image of at least one hand and extremity and the chromakeyed mask 152' represents real-time camera-view (RT-CV) image data. The RT-CV image data from the at least one camera device 115 may be sent as pixel content to computing system 105.

In some embodiments, the computing system 105 may create a mixed-reality (MR) portal mask 155 which uses geometry masking in virtual reality registered to a focal point in the HMD apparatus. The term "portal mask" and "geometry mask" may be used interchangeably in some embodiments. In some embodiments, the geometry mask may provide a virtual-to-real portal into the VR environment or VR-CGS image 100. The virtual-to-real portal is a window to limit pixels of the camera-view image to only those pixels in the VR-CGS image 100 registered to the MR portal mask 155. In other words, all camera pixels registered as outside of the MR portal mask 155 may be discarded from the camera-view image. The MR portal mask 155 may also include frame pixels 153, by way of non-limiting example, which may be masked to include the same chromakey color as the mask 152'. In some embodiments, the MR portal mask 155 may be configured to block out from the camera-view image those pixels of the display device 150 so that the pass-through camera image does not include the display device 150 in the final composite rendering. The display device 150 if not discarded from the camera-view image may appear in the composite mixed-reality final scene but at a lower resolution than the resolution of the VR-CGS image 100. Some portal masks may not require mixed-reality functionality and provide only a non-simulated chromakey mask for use in placing or aligning VR components such as VR components which do not overlap a tactile user interface.

The camera-view image may capture the chromakey mask 152' overlaid and registered to the MR portal mask 155 or portions thereof. The chromakey mask 152' provides a real-to-virtual portal. In operation, those pixels associated with the chromakey mask 152 being captured in the camera-view image map to circuit elements of the touch-sensitive circuit of the TTSS grid 152". A virtual chromakey mask (i.e., pixels 156) may be registered and aligned with the pixels of the chromakeyed TTSS, according to an instant in time, in virtual space. The virtual chromakey mask is set to a first mask value. The display device 150 may include a frame 153 or structure surrounding the TTSS 152. The frame 153 is shown surrounding the mixed-reality portal mask 155 as the display screen frame 153 may be chromakeyed using a non-simulated chromakey mask. The portal mask 155 (not including the frame 153) has a one-to-one pixel correspondence to register pixels of the VIP overlay template 160 and with pixels of the chromakeyed TTSS 152. In other words, the pixels of the portal mask 155 are also registered to and aligned with the touch-sensitive circuit of the TTSS grid 152". The term "virtual chromakey mask" refers to "TTSS mask". The TTSS mask may be a subset of pixels within the pixel set of the portal mask 155.

The portal mask 155, since in virtual space, may be used to isolate those pixels that are associated with of the VR-CGS image 100 and/or the VIP overlay template 160 relative to those pixels of a real camera-view image for a composite mixed-reality final scene 220 (FIG. 2).

The IMM system 148, during a portal masking process, identifies and extracts: i) those pixels 156 corresponding to the chromakeyed TTSS 152 in the pixel content of the received RT-CV image data; and ii) those virtual pixels 175 corresponding to an object, the hand 15 and/or extremity in the pixel content of the received RT-CV image data. The virtual pixels 175 are set to a second mask value. The first mask value and second mask value are different values. The terms "first" and "second" are not meant to be limiting but used as a frame of reference. There may be only one mask value for comparison to a predetermined parameter (i.e., color) to either include or exclude certain portions of pixels in the camera-view image.

The pixels 156 register to the overlapping pixels in the VIP overlay template 160 to form a portal mask portion to mask the color of the chromakeyed TTSS 152 not concealed (hidden) by the hand and/or extremity. The virtual pixels 175 register to those pixels in the VIP overlay template 160 which overlap and align with image data of the hand and extremity 15 to form a hand mask. The term "hand mask 175," "virtual pixels 175" and "camera-view mask 175" may be used interchangeably herein. The terms "virtual pixels 175," "camera-view mask 175" and "hand mask 175" being derived from pixel content extracted from the camera-view image corresponding to a real image of at least one of a user's hand, finger, extremity or other object in the ambient environment overlapping the chromakey mask. While, the example herein explains the operation of the embodiments in relation to one hand and/or extremity, the process herein equally applies to the simultaneous capture of any portion of at least one of hand, fingers, and extremities of one or both hands.

In other embodiments, additional non-interactive green-screens or physical cockpit components may be painted or masked green or other chromakey color to ensure that they are masked out of a pass-through image displayed on the HMD apparatus (FIG. 2). In some embodiments, one or all of the interactive chromakey colored components and locations may be aligned and registered to a geometric mask.

In terms of optimization, the IMM system 148 may skip the generation of per-pixel chromakey or portal mask in cases where the scene contains no portal masking elements/ objects. For example, the IMM module 348 (FIG. 3A) may determine that the VIP overlay template 160 is not contained in the current scene of the VR-CGS, and knowing that it is the only element for which masking is used, the IMM system 148 may skip the geometry and/or chromakey masking processing instructions for applying the geometry and/or chromakey masking. The geometry and/or chromakey masking processing instructions can be eliminated because the portal objects are virtual objects in the virtual scene and may not contain pixels. The portal objects are turned into pixels by the graphics processing unit (GPU) 1050 written into the portal mask while the VR scene is generated.

In some embodiments, the camera-view image may be pre-processed to determine if the entire image is masked out, (e.g., no hand is visible as stated). The processing time and required processing resources required to do this pre-processing may cancel out most of the saving gained from avoiding the application of the camera-view mask. The VR-CGS image 100 may use more than one geometry mask to remove pixels of the video pass-through image.

Figure 1E:
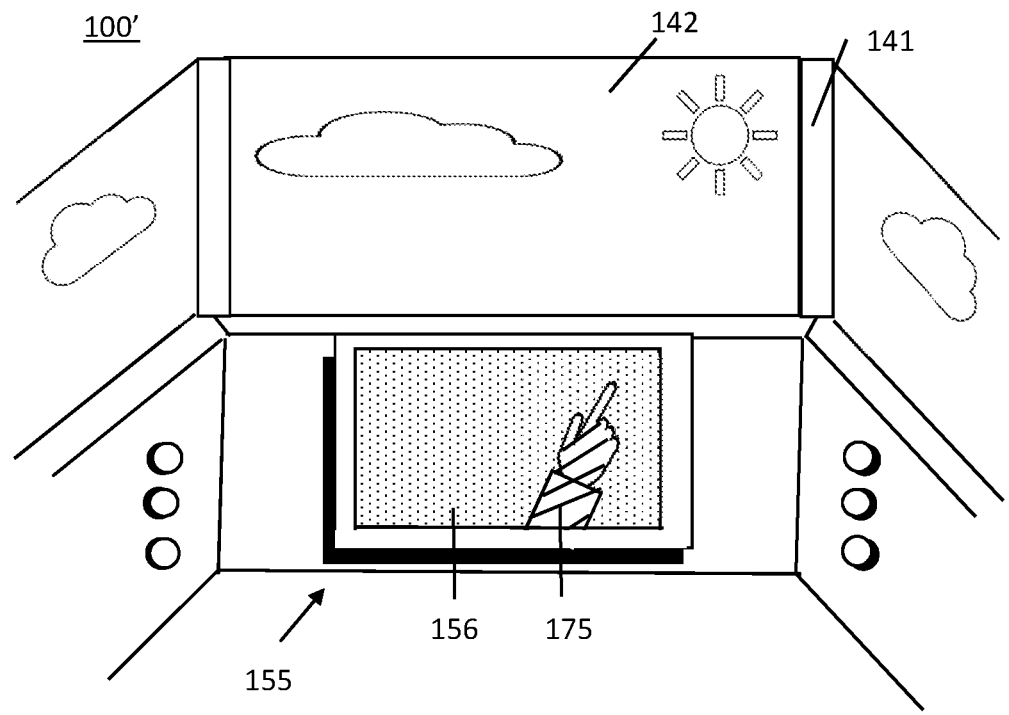
FIG. 1E illustrates a masked virtual-reality computer-generated scene (VR-CGS) image including a mixed-reality portal mask registered to and overlaid in the VR-CGS image.

Referring also to FIG. 1E, a masked VR-CGS image 100' including a mixed-reality (MR) portal mask 155 overlaid in the VR-CGS image 100 is illustrated. The masked VR-CGS image 100' is similar to the VR-CGS image 100. Thus, only the differences will be described. The computing system 105 forms the MR portal mask 155 at a focal point for registration of and into the VR-CGS image 100. The MR portal mask 155 in the VR-CGS image may include those virtual pixels 175 corresponding to the hand mask replacing the aligned pixels of the initial VIP overlay template 160. As can be appreciated, in some instances, the hand or extremity may not be within the FOV of the camera device. Thus, in some instances, the hand mask would be omitted as the pixels associated with the hand and extremity in the camera-view image would be zero (0).

Returning again to FIG. 1D, the IMM system 148 from the MR portal mask 155 forms a virtual interactive panel overlay instantiation (VIP-OI) image 165 for an instant in real time. The VIP-OI image 165 includes pixels 156 of the portal mask 155 with the overlapping pixels representative of pixel content associated with the VIP overlay template 160 to form VIP overlay template portion 160' or TTSS mask. In some embodiments, in the absence of a user's hand in the field-of-view (FOV) of the at least one camera, the VIP overlay template 160 and VIP overlay template portion 160' may be essentially the same. In other words, the VIP-OI image 165 would have no (zero) hand pixels (i.e., virtual pixels 175) or other camera-view mask pixels.

The MR portal mask 155 may include a TTSS mask of virtual pixel locations mapped to the VIP overlay template 160 and locations of the touch-sensitive circuit of the TTSS 150 to which the VIP overlay template 160 are linked; and a camera-view or hand mask 175 associated with the camera-view image having a hand and/or extremity or other object in a frame of the ambient environment which intersect or align with the virtual pixels in the VIP overlay template 160.

Figure 1F:
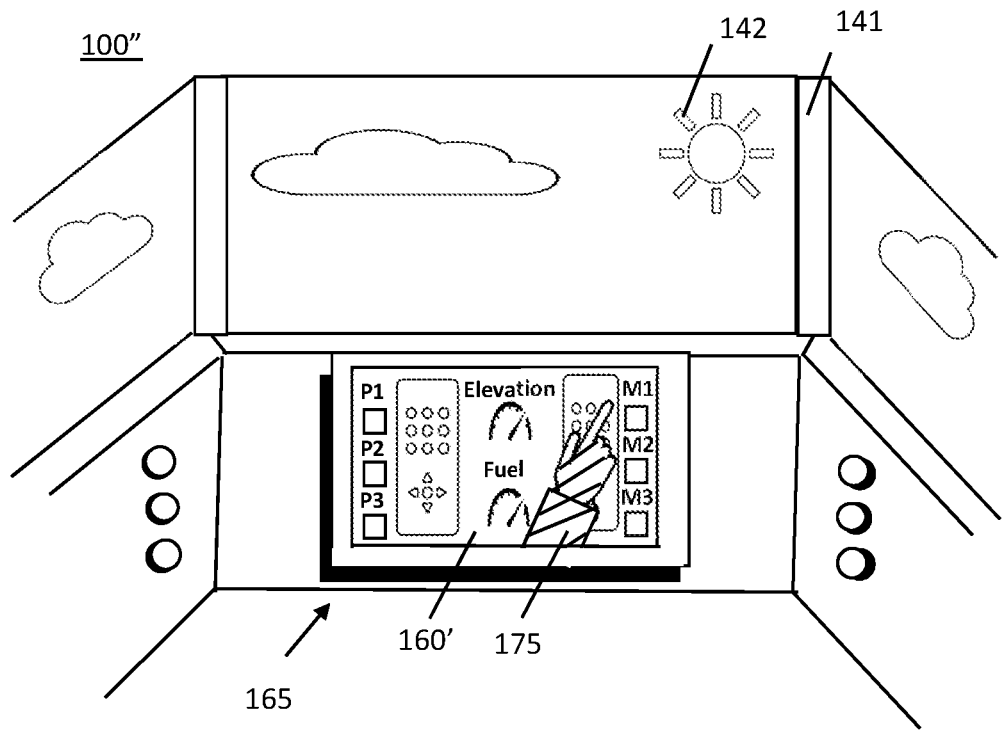
FIG. 1F illustrates a virtual-reality computer-generated scene (VR-CGS) image with those pixels of the virtual interactive panel overlay instantiation (VIP-OI) image.

Referring also to FIG. 1F, a virtual-reality computer-generated scene (VR-CGS) image 100" is illustrated with those virtual pixels of the virtual interactive panel overlay instantiation (VIP-OI) image 165. The VR-CGS image 100" may be the final (rendered) virtual scene for incorporation into the composite mixed-reality final scene 220 (FIG. 2). Thus, the VR-CGS image 100" may sometimes be referred to as a final virtual scene.

As the user's hand(s) or extremities change, the virtual interactive panel overlay instantiation (VIP-OI) image 165 changes from one instant to another instant. The VIP-OI image 165 changes may be the result of updates to gauges or indicators, based on the user's interaction with the simulated vehicle. As described above in relation to FIG. 1D, VIP-OI image 165 is formed by replacing the pixels 156 of the TTSS mask of the portal mask 155 with the virtual pixels representative of VIP overlay template portion 160'.

The VIP overlay template portion 160' is the same as the VIP overlay template 160 except that the VIP overlay template 160' includes only that portion of the VIP overlay template 160 that does not have pixels which intersect or overlap virtual (hand) pixels (i.e., pixels 175) from the camera-view image. Thus, the composite mixed-reality final scene 220 includes the VIP overlay template portion 160' and those pixels in the camera-view image overlapping the virtual pixels 175. The virtual pixels 175 are shown in FIGS. 1E and 1F for the sake of discussion and do not represent the real hand of the user.

Figure 3B:
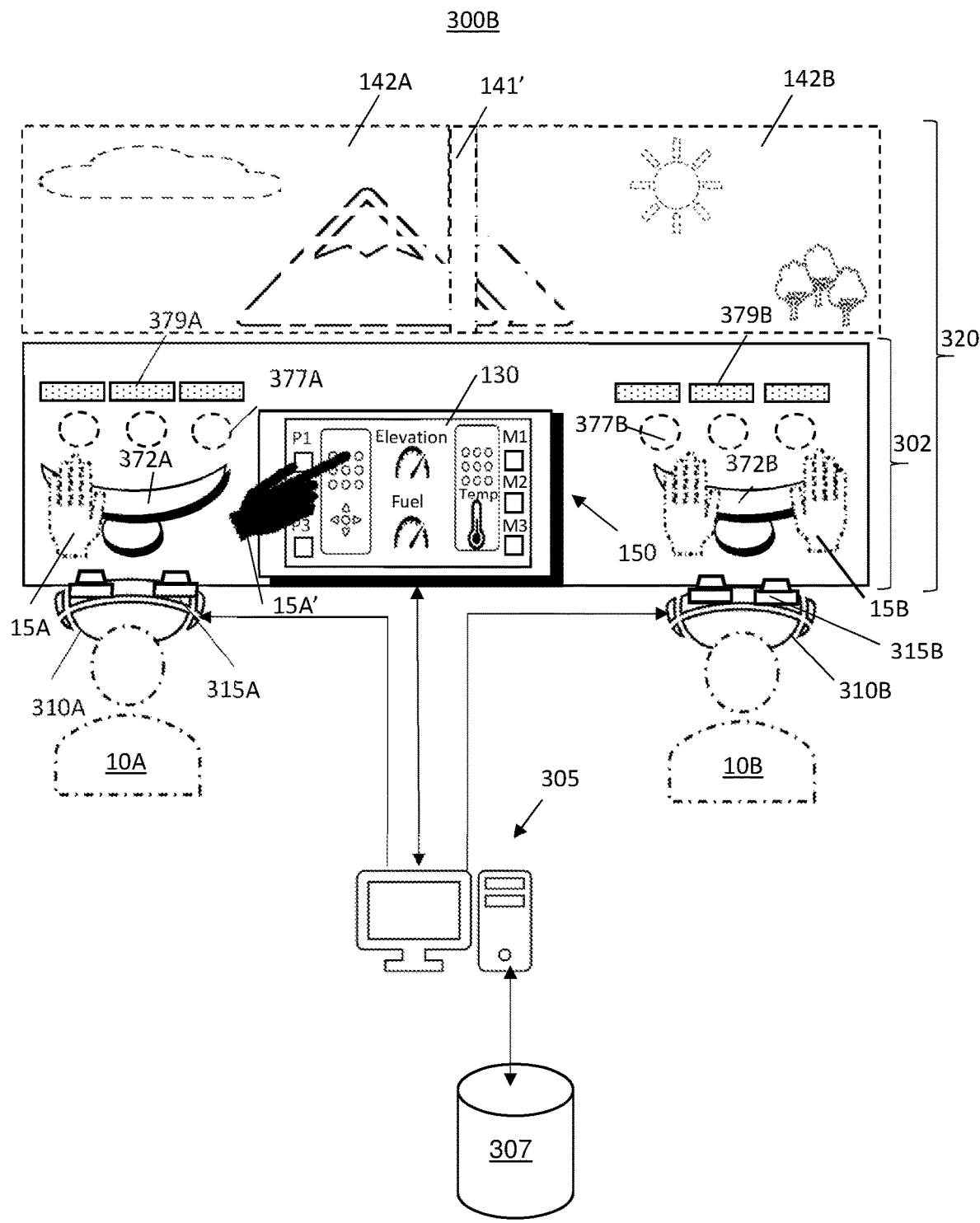
FIG. 3B illustrates a simulation system displaying a composite mixed-reality (MR) scene.

FIG. 2 illustrates a composite mixed-reality (MR) final scene 220 displayed on lenses 112 of the head-mounted display (HMD) apparatus 110 of a simulation system (FIG. 3A or 3B). The composite MR final scene 220 may include virtual images configured to be displayed in virtual 3D space with real images of a user's hand or other object captured by a camera device in real time. The composite mixed-reality (MR) final scene 220 may be displayed on lenses and/or display(s) of an immersive HMD apparatus, video see-thru HMD apparatus or optical see-thru HMD apparatus. The composite MR final scene 220 is a composite of pixel content of mixed image data representative of the VR-CGS image 100" and the camera-view image of the real hand/extremity 15' captured by the at least one camera device 115. The real hand/extremity 15' corresponds to the virtual pixels 175 of FIG. 1F. The VR-CGS image 100" may be a function of virtual-reality (VR) image data such as the OTW scenes 142, 142L and 142R, CFI 141, left sidewall 141L, right sidewall 141R and the VIP-OI image 165, collectively.

By way of non-limiting example, when the user turns their head left, the OTW scene 142L along left sidewall 141L of the CFI 141 may be altered according to a position of the vehicle along the navigation path, orientation of the vehicle and user's head orientation and position relative to the 3D image of the CFI 141. By way of non-limiting example, when the user turns their head right, the OTW scene 142R along right sidewall 141R of the CFI 141 may be altered according to a position of the vehicle along the navigation path, orientation of the vehicle and user's head orientation and position relative to the 3D image of the CFI 141.

In some embodiments herein, the OTW scene 142, 142R and 142L may use the same FOV and view location as the virtual CFI 141. For example, there may be one view per eye. While, the OTW scene 142, 142R and 142L may not be broken into sections, the entire OTW scene 142, 142R and 142L may be broken up into multiple views to support HMDs with FOVs to be represented by a single planar projection. If a user's head is moved, all views would move with it. In such an embodiment, the masking applications would be applied per-pixel in each view. By way of non-limiting example, the CFI 141L and OTW scene 142L may be one section. The CFI 141R and OTW scene 142R may be another section. The CFI 141 and OTW scene 142 may be yet another section.

The simulation system 300A (FIG. 3A) may be configured to register the VR-CGS image 100" to the lenses 112 of the HMD apparatus 110 with the pass-through camera image data of the user's hand/extremity 15 registered in the VR-CGS image 100" using chromakey masking. In some embodiments, the lenses 112 may be opaque (non-transmissive) such that light from the ambient environment does not pass through the lens to the user's eyes. In other embodiments, the lenses 112 may be display devices or part of an optical system. The composite MR final scene 220 may include more than just an image of a user's hand. The composite MR final scene 220 may include both hands in the FOV, such as FOV-A and FOV-B of the cameras 115A and 115B, respectively. The simulator includes a MR instrumentation panel simulator device 230 including a non-simulated display device in the ambient environment with a non-simulated touch-sensitive surface and touch-sensitive circuit. The MR instrumentation panel simulator device 230 is created by overlaying the virtual pixel content representative of the VIP overlay template portion 160' only viewable through the HMD apparatus. Thus, the virtual-reality text of the MR instrumentation panel simulator device is at the first resolution of the computing system as translated to the HMD apparatus. The user is interfaced with the MR instrumentation panel simulator device 230 through the HMD apparatus as the HMD apparatus provides or overlays a pass-through video of the user's own hands in the ambient environment over the MR instrumentation panel simulator device 230 interacting with device 230.

In operation, as the user interacts with the virtual instrumentation panel device 130, the user sees via the HMD apparatus, being registered to and overlapping with the display device 150. As the user interacts with the panel device 130, the user also interacts with the TTSS 152 serving as a tactile user input interface.

As can be seen from the description above, the HMD apparatus 110 may include its own processor and communication interfaces to communicate wired or wirelessly with the processor of computing system 105, capture images, process images, display the composite MR scenes, etc.

FIG. 3A illustrates an interactive simulation system 300A. The interactive simulation system 300A may include a computing system 305 and at least one head-mounted display (HMD) apparatus 310A to be worn by a user. The computing system 305 may include simulation application 340 and IMM module 348, both of which include instructions stored in memory 307 which when executed by at least one processor of the computing system 305 causes the at least one processor to perform the acts described herein. The system 300A may include HMD apparatus 310B.

The HMD apparatus 310A may include at least one camera 315A coupled to the HMD apparatus 310A. The at least one camera 315A may include a stereo RGB pass-through camera system. The simulation system 300A may include other cameras (not shown) and/or head trackers in the room or vehicle. The HMD apparatus 310A may include a location tracker 117 (FIG. 1D) and INS 125 mounted on the HMD apparatus 310A to track and sense the position and orientation of the head of the user or camera mounted to the head of the user. At least one camera is forward facing suggesting the direction of gaze of the user. The computing system 305 and other hardware components of the IMM system 148 may be described in more detail in relation to FIG. 10. The HMD apparatus 310B may include at least one camera 315B and functions similar to HMD apparatus 310A. Thus, only one HMD apparatus 310A will be described in detail.

The HMD apparatus 310A is configured with close to the eye viewing of the composite MR final scene 220 (FIG. 2) mapped to the interior surface of the lenses 112. The HMD apparatus 310A, by way of non-limiting example, may comprise, or include one or more components of the head-mounted display device described in U.S. Pat. No. 8,781,794, entitled "METHODS AND SYSTEMS FOR CREATING FREE SPACE REFLECTIVE OPTICAL SURFACES," filed on Aug. 17, 2011 and U.S. Pat. No. 9,632,315, entitled "HEAD-MOUNTED DISPLAY APPARATUS EMPLOYING ONE OR MORE FRESNEL LENSES," filed on Aug. 17, 2011, each of which is hereby incorporated by reference herein. The lenses may be created based on oxel calculations such as described in U.S. Pat. No. 9,454,007, titled "FREE-SPACE LENS DESIGN AND LENSES THEREFROM," incorporated herein by reference as if set forth in full below. Nonetheless, other HMD apparatuses may be employed but adapted to perform the functions described herein to interface with the simulation system 300A and IMM system 148.

The computing system 305 may include or be coupled to memory 307 for storing therein program instructions associated with a simulation application 340. The simulation application 340 may include virtual-reality (VR) out-the-window (OTW) scene module 342 comprising image data representative of OTW scenes 142 (FIG. 1A). The OTW scenes 142, 142L and 142R may be aerial scenes or ground-level scenes of a particular area on earth. The OTW scene may include image data representative of landmarks and terrain along the flight or navigated path, for example. The OTW scenes module 342 may include program instructions to cause changes to the OTW scenes based on changes in the orientation or position of the vehicle during the simulation, for example. The OTW scenes module 342 may include program instructions to cause changes to the OTW scenes based on changes of the user's head and/or camera locations. The OTW scenes module 342 may include program instructions to cause changes to the OTW scenes based on other simulation instruction changes or received user inputs. The OTW scenes incorporated into the VR-CGS image 100 may be selectable by the user. By way of non-limiting example, the OTW scenes may be representative of a selected state, city, country, and ocean.

The simulation application 340 may also include TTSS recorded user interactions 344 to the application 340 registered during the interaction of the user with one or more of the interactive tactile instruments including the chromakeyed TTSS 152. User interactions may control the operation of the vehicle based on the manipulation of one or more of the interactive tactile instruments to alter a flight, navigated path, orientation or position of a simulated vehicle, for example. The interactive tactile instruments may include pilot control columns or yokes 372A and 372B, for example, along with display device 150. By way of non-limiting example, pilot control columns or yokes 372 and 372B may be painted or colored a chromakey color, so that the user can also see their hands grasping the yokes 372 and 372B in the ambient environment, using the method described herein by the IMM module.

The simulation application 340 may include cockpit virtual-reality (VR) scene module 341 including image data representative of CPIs 141 and sidewalls 141L and 141R. Different CPIs 141 may be accessed such as to vary gaming or training operations by changing different models of the vehicle. The cockpit virtual-reality (VR) scene module 341 may include a selected CPI 141. The CPI 141, during a simulation session based on the user's head position and/or orientation relative to the current CPI 141 associated with a current VR-CGS image 100 (FIG. 1A), may be updated, by way of non-limiting example.

In some embodiments, the simulation application 340 may cause VR gauges, indicators, instrumentation, etc. be adjusted or altered in the next instance of VR-CGS image 100 (FIG. 1A), in response to the recorded user interaction 344 to the application 340.

The simulation application 340 may include a touch-sensitive surface (TSS) control map 346 associated with the VIP overlay template 160. The TSS control map 346 may identify those area associated with gauges and indicators, for example, The TSS control map 346 may identify those areas associated with text and non-text areas which are not intended to cause the simulation application 340 to adjust or alter based on a user's interaction. Hence, the TSS control map 346 may cause those areas/pixels in the touch-sensitive surface, which are not associated with a control button or mechanism in the VIP overlay template 160, to be disengaged so that the user does not inadvertently cause an unintentional input to the simulation application 340. The TSS control map 346 may be a function of and mapped/linked to the touch-sensitive circuit of the TTSS grid 152" (FIG. 1D).

The simulation application 340 may include a VIP template module 360 having one or more VIP overlay templates 160 for use in creating the mixed-reality (MR) instrumentation panel simulator device 230 (FIG. 2). The VIP template module 360 may include program instructions to cause simulation data to be altered in fields of the VIP overlay templates 160 for display. For example, the fields may include those areas associated with gauges and indicators. The pixel content of the gauges and indicators may be generated based on simulation modeling data expected based on the operation of a simulated vehicle.

The memory 307 may include an IMM module 348. The IMM module 348 is shown as part of the simulation system 300A. However, the IMM module 348 may share resources with the simulation system 300A or include its own computing system. For example, the IMM module 348 may be part of the HMD apparatus 310A, 310B. The IMM module 348 may be part of a computing system associated with the display device 150.

In some embodiments, the simulation system 300A may include a vehicle control deck 302 including the display device 150. The vehicle control deck 302 may also include chromakey masking members 379A, 379B. The use of the chromakey masking members 379A, 379B will be described in more detail in relation to FIG. 3B. The IMM module 348 may include chromakey mask detectors 351 to detect chromakey masking members 379A, as will be described in more detail in relation to FIG. 3B and the chromakey mask 152'. The chromakey masking members 379A, 379B may be the same color or a different color of the chromakey mask 152'. The IMM module 348 may include chromakey mask generators 352 to cause the display device 150 to electronically display a chromakey mask 152' on the TTSS 152. The chromakey mask 152' may be a function of the display device associated with the touch-sensitive surface as each display device may have a different size and orientation (landscape or portrait). The chromakey mask generators 352 may be configured generate other electronic chromakey masks for other TTSS in the ambient environment and detected by computer system 305.

The IMM module 348 may include a MR portal mask generator 355 configured to create the MR portal mask 155 described above in relation to FIG. 1D. The MR portal mask generator 355 includes program instructions configured to isolate the interactive user device (i.e., display device 150) in the ambient environment so that those pixels of the VIP overlay template 160 may be registered to a focal point associated with HMD apparatus worn by the user relative to the ambient environment. The MR portal mask generator 355 includes program instructions configured to, via a VIP template pixel extractor 360', form the TTSS mask using those isolated pixels associated with the VIP overlay template 160, which match the chromakey color. The MR portal mask generator 355 includes program instructions configured to, via the camera-view (CV) pixel extractor 375, form the camera-view mask using those isolated pixels associated with the camera-view image, determined to overlap the portal mask 155 and not match the chromakey color. The mask generator 355 may include program instructions configured to set the pixels of the chromakey mask associated with the VIP overlay template 160 to the first mask value.

The identified camera-view pixels from the camera-view pixel extractor 375 are used for the registration and generation of a camera-view mask 175. The mask generator 355 may also include instructions to generate the second mask value, if required. In some embodiments, at least one mask value may be used. If multiple chromakey masks as used, different mask values may be used for different chromakey colors or to distinguish locations of other chromakey masks.

The masking process may include combining the VR-CGS image 100 and the camera-view image, at a high level. Each of the VR-CGS image 100 and the camera-view image has its own mask for showing/hiding its pixels. The portal mask is associated with pixels of the VIP overlay template 160 because it is generated using objects in the VR-CGS image 100 that act as portals into/out-of the real world. The TTSS mask is generated for each camera-view pixel of the portal mask having a pixel color representative of the chromakey color of the imaged non-simulated chromakey mask. The camera-view mask of the portal mask is generated for each camera-view pixel of the portal mask having a pixel color which does not match the chromakey color of the non-simulated chromakey mask.

While the VIP overlay template 160 has its own off-window used for updating the image and handling input, the VIP overlay template 160 is just a virtual object that is part of the VR-CGS image 100, as best seen in FIG. 1A. The image of the VIP overlay template 160 is textured onto the object. So, in terms of masking pixels, the VIP overlay template 160 is placed at the same location as the portal object (i.e., display device 150). The matching location ensures the per pixel alignment between the portal mask and the VIP overlay template 160 as described, but it is as a result of configuring the portal and overlay geometry to line up or align.

In general, the camera-view image is composited directly with the VR-CGS image 100. It would actually involve more work to project the camera-view image into the space of the VIP overlay template 160 and register. It also may not provide the correct stereo vision. The stereo effect is a byproduct of overlaying a separate camera feed on top of the left and right eye VR view. Both views use the same image for the VIP overlay template 160.

The IMM module 348 may include a VIP-OI generator 365. The VIP-OI generator 365 includes program instructions configured to generate a VIP-OI image 165 (FIGS. 1D and 1F). The VIP-OI 165 is generated by replacing the identified pixels 156 of the portal mask 155 with the overlapping or registered pixels representative of VIP overlay template 160 to form VIP overlay template portion 160'. The pixels 156 are identifiable by the first mask value. The VIP-OI image 165 includes the VIP overlay template portion 160' and camera-view mask 175.

The simulation system 300A may include a plurality of real interactive tactile instruments which may include tools, objects, hand-manipulated devices and/or hand-activated devices, such as joy sticks. The plurality of interactive tactile instruments includes at least one touch-sensitive user input display device 150 with a touch-sensitive surface 152, previously described in relation to FIGS. 1C and 1D. The touch-sensitive surface 152 is represented with a chromakey mask 152', as described above in relation to FIG. 1D. The at least one touch-sensitive user input display device 150 may include at least one multi-function display (MFD) device configured to display an interactive panel associated with the simulation training.

The simulation system 300A may be configured for training a trainee or user in a mixed-reality computing simulation platform. By way of non-limiting example, training may be for the operation of air-borne vehicles, ground vehicles, sea-borne vehicles, spacecraft vehicles, etc. using one or more interactive tactile instruments (ITIs) as part of a vehicle control deck 302. The control deck 302 may be incorporated into the CPI 141 and may also be represented as a chromakey mask to register and overlap corresponding VR elements of the VR-CGS image 100.

The embodiments herein will be described in relation to training a pilot on aircraft controls or portion of the controls associated with an optional vehicle control deck 302, such as a flight control deck. The embodiments shown in FIGS. 1A-1F is for a single user such as for only a single pilot or a single co-pilot. A simulation system for a single user may include one or more display devices 150. The IMM module 348 may be configured to identify each display device in the camera images based on the initial non-simulated chromakey mask 152' displayed by each touch-sensitive surface. Thus, each touch-sensitive surface may be individually identified in the camera-view image. The IMM module 348 may be configured to cause the display of the chromakey mask 152' directly by one or more TTSSs in the ambient environment.

In practice, no image processing on the camera image to identify and register elements is required. The embodiments may use one configurable chromakey color value and its used solely for hiding/removing pixels from the final VR scene and/or camera-view image. The chromakey value may not be checked until a final decision is made to include a pixel in the final VR scene. This may be done on the graphics processing unit (GPU) 1050 where the results cannot be trivially read back.

In other embodiments, the simulation system may include one or more display devices 150 and pilot control columns or yokes 372A and/or 372B. The yokes 372A and/or 372B may be coupled to the computing system 305 such as without limitation by wireless communication protocols, such as BLUETOOTH, WIFI, or other near field communication protocols. The chromakey mask detectors 351 may be configured to detect the chromakey mask of the yokes 372A and/or 372B.

The simulation system 300A may include a second HMD apparatus 310B having mounted thereon at least one camera device 315B. In such an embodiment, the HMD apparatus 310A may be associated with a pilot while HMD apparatus 310B is associated with a co-pilot. The pilot control columns or yokes 372A and 372B, if used, may be for each user. In some embodiments, all of the instrumentation of the vehicle control deck 302 may be implemented in one or more touch-sensitive surface with portions thereof being masked with a hand mask so that the image of the camera in the pass-through mode allows the user to see their hands interacting with virtual objects representative of interactive tactile instruments or virtual instrumentation.

Referring also to FIG. 3B, a simulation system 300B displaying a composite mixed-reality (MR) scene 320 is shown. FIG. 3B includes similar elements as FIG. 3A. Therefore, only the differences will be described in detail.

The composite mixed-reality (MR) scene 320 may include the current CPI 141' and OTW scenes 142A and 142B. The OTW scenes 142A and 142B would be shown at a first perspective relative to the head of user 10A wearing the HMD apparatus 310A. Likewise, the OTW scenes 142A and 142B may be shown at a second perspective relative to the head of user 10B wearing the HMD apparatus 310B. The CPI 141' and OTW scenes 142A and 142B are denoted in dashed line to denote virtual-reality computer images. The scene 142A and 142B may be updated based on a navigational path over a course of time during the simulation and would be based on the perspective of the individual users 10A and 10B. For the sake of brevity, some of the OTW scenes and CPI 141' sidewalls have been omitted. The composite mixed-reality (MR) scene 320 is configured to be displayed in 3D space wherein sidewalls of the cockpit framework/chassis may also be displayed as shown in FIG. 1A. The composite MR scene 320 while not shown in this view is displayed on the HMD apparatus 310A or 310B, from the perspective of the user 10A or 10B.

The pilot's control column or yoke 372A is generally positioned in front of the pilot (i.e., user 10A) and configured to be gripped, touched and moved by hands 15A of user 10A (i.e., pilot). The yoke 372A may control the pitch, yaw and roll, for example, of a simulated aircraft vehicle. The control deck 302 may include an VR instrument panel 377A denoted in dashed circles. The control deck 302 may include side consoles (not shown), overhead consoles (not shown), etc., implemented in the form of a tactile touch-sensitive surface associated with a display device. The control deck 302 may be part of a VR-CGS image (VR-CGS image 100 of FIG. 1A) or may be an object in the ambient environment which may be subjected to masking.

The instrument panel 377A is shown as a dash-line circle to denote that the instrument panel 377A may be computer-generated images (CGI) as part of a MR composite final scene 320, in some embodiments. The control deck 302 may optionally include chromakey members 379A. The chromakey members 379A may be affixed to the control deck 302 in a manner which is associated with an instrument panel 377A, for example. The simulation system may display virtual-reality (VR) text overlaid on the chromakey members 379A and/or 379B wherein such text may also be part of the composite MR scene.

Text may be included in the VR-CGS and the areas of the real cockpit where text is located are may be chroma-key colored so that VR text at a higher resolution may be displayed. The real and virtual cockpit would need to be aligned. If the text overlay was not part of the model itself, then it may be better if the text rendered into a portal mask so that it could be forced on top of the camera-view image without the need for green stickers in the cockpit. That way the text could be turned or adjusted to face the user for example so that it could be read more easily.

The hands 15A of user 10A is shown as dashed, dot lines to denote that the hands are not part of the flight control deck 302, but captured by the pass-through camera 315A, as the result of interaction of user 10A with any ITI of the flight control deck 302. In this illustration, hand 15A' is intended to represent the user's hand blended with the mixed-reality (MR) scene 320. Here, the user's hand 15A' is touching a location on the touch-sensitive screen mapped and linked to the virtual instrumentation panel device 130.

In the example, the plurality of interactive tactile instruments (ITIs) may include a pilot control column or yoke 372B for a second trainee or user 10B. The yoke 372B is generally positioned in front of the pilot (i.e., user 10B) and configured to be gripped or touched by hands 15B, denoted as dashed lines, of user 10B and seen on through the HMD apparatus 310B. The yoke 372B may control the pitch, yaw and roll, for example, of an aircraft. The flight deck may include an instrument panel 377B for the user 10B and chromakey members 379A.

The simulation application 340 may include program code to control the vehicle via a control deck 302 based on recorded user interactions 344 by users 10A and 10B, individually, simultaneously and/or collectively. The recorded user interactions 344 may be entered into a user log. As with some vehicles, vehicle features may be controlled by more than one user in real time. Thus, the simulation application 340 may include scripts which simulate a vehicle's reaction based on a team of operators (i.e., users 10A and 10B). Some vehicles may require a team of two or more users manipulating vehicle controls simultaneously to cause multiple vehicle reactions in real time and/or simultaneously.

The simulation application 340 may be caused to be altered, in response to the computing system 305 determining a vehicle reaction to the recorded user interaction to an instant of the simulation application 340. The simulated vehicle reaction may cause the virtual-reality instrumentation gauges or indicators to be altered in the composite MR scene 320. By way of non-limiting example, the VR gauges may include a dial which is caused to be moved, as an example, in response to a simulated vehicle reaction. An indicator may be caused to change colors in the composite MR scene 320, as an example, in response to a simulated vehicle reaction. As can be appreciated, simulators are very complex and are configured to train a user on many possible vehicle reactions as a trainee interacts with the virtual instrumentation panel device 130. Describing each and every one of the vehicle reactions and outcomes is prohibitive. The same applies for gaming simulators.

Some items of a CPI 141' and OTW scenes 142A and 142B have been omitted to provide space for expanded elements of the composite MR scene 320. For example, virtual-reality side panels in the cockpit are not shown. Furthermore, other display devices are not shown which themselves may provide a miscellaneous virtual instrumentation panel device to provide a different set of controls other than those of the virtual instrumentation panel device 130.

The simulation system 300A may comprise geometric masking via stereo video-pass thru cameras that adapt a composite MR scene to at least one display device of an immersive HMD apparatus, that simultaneously employs chromakey-based masking on the real touch-sensitive input display device, effectively turning the touchscreen of the display device to chromakey green or other chromakey color to overlay the virtual interactive panel overlay template 160 over the real chromakeyed display. The term "real touch-sensitive input device" may be used interchangeably herein with the term "real touchscreen."

The simulation system 300A may be an interactive synthetic simulator with enhanced readability. The IMM module 348 may employ geometry-based masking and chromakey-based masking techniques to identify/register the real world to the virtual environment. The chromakey-based masking effectively turns a touchscreen of a touchscreen display in the real world to a chromakey color, such as green, so that during a simulation, the chromakey color can be readily identified to overlay a virtual instrumentation panel over the display device with the TTSS. The virtual instrumentation panel includes controls mapped and linked to touch-sensitive areas of the touchscreen display device to provide a MR user input interface to the computer-implemented simulator.

For ground vehicles, the yoke may be substituted with a steering wheel or steering controller to be moved by the hands. Other vehicles may include steering mechanisms that may be used as part of a simulation. In other embodiments, a simulator may include an instrumentation panel which may be integrated into a real chromakeyed display device for mixed-reality immersive training platforms.

The IMM module 348 may use other masking variations such as geometric-based masking, chromakey-based masking, chromakey-based and geometric-based masking, inverted chromakey-based and geometric-based masking—these can be configured on the fly. Inverted chromakey-based and geometric-based masking can be used in a green-screen dome with certain factors geometrically masked (the reverse).

The processes and methods of the embodiment herein will be described below. The method blocks described herein may be performed in the order shown, a different order or contemporaneously. One or more blocks may be omitted, and blocks may be added. In some iterations, blocks may be omitted or performed in a different order.

Figure 4A:
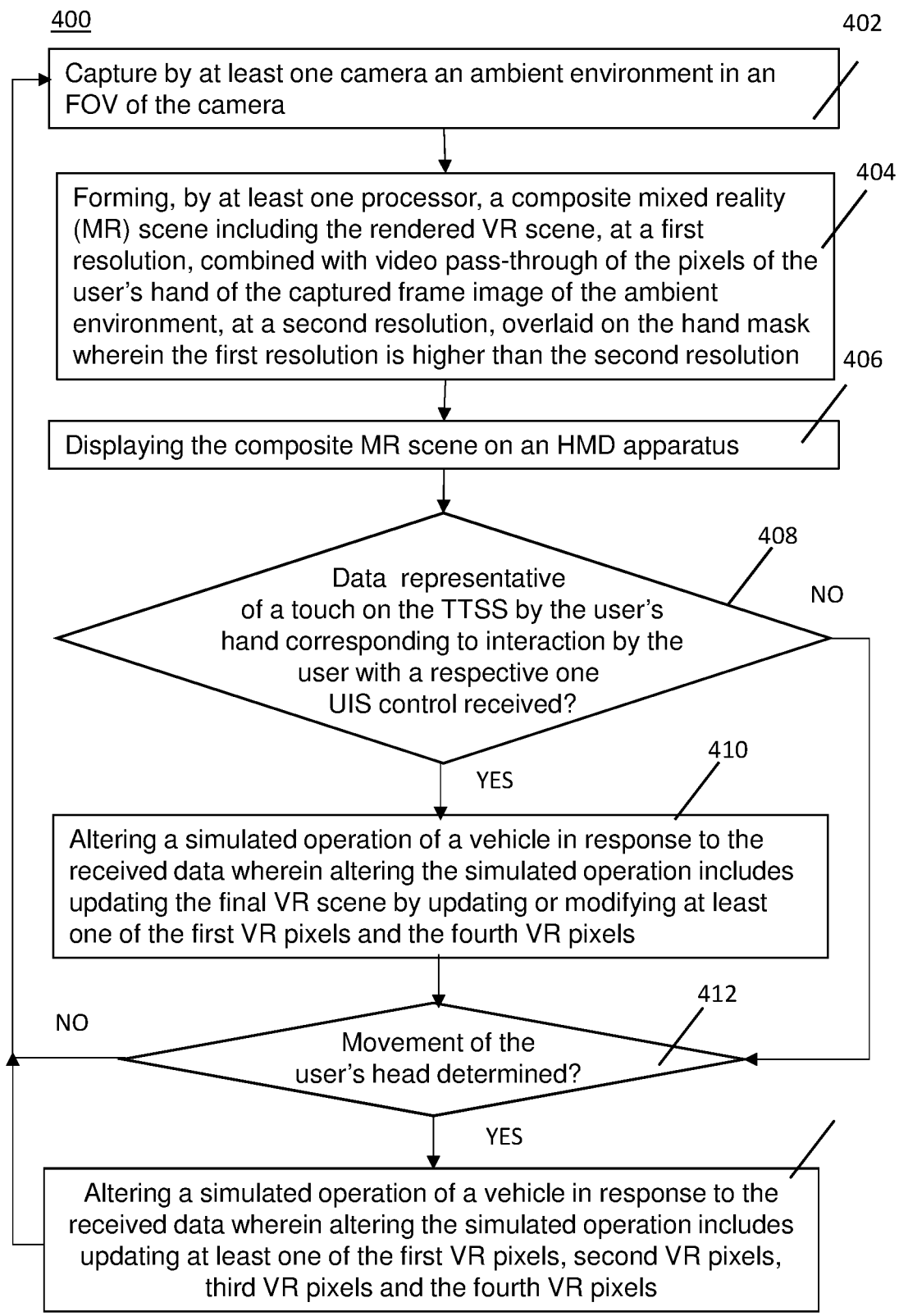
FIG. 4A illustrates a flowchart of a method of conducting a simulation using interactive mixed masking.

FIG. 4A illustrates a flowchart of a method 400 for conducting a simulation using interactive mixed masking. FIG. 4B illustrates a flowchart of a method 448 for interactive mixed masking (IMM). FIGS. 4A-4B will be described in relation to FIGS. 1A-1F. For the purposes of discussion, the particular simulation application has been selected for the particular simulated machine or vehicle. Therefore, the particular VIP overlay template 160 (FIG. 1A) is known to the computing system. The VR-CGS image 100 may also be selected, as will be discussed in relation to FIG. 5.

The method 400, at block 402, may include capturing, by at least one camera, a captured frame image (i.e., camera-view image) of the ambient embodiment (FIG. 1D). The ambient embodiment may include objects, a user's hand 15 or extremity in the frame image.

The method 400, at block 404, may include forming, by at least one processor, a composite mixed reality (MR) scene 220 (FIG. 2) including the rendered VR scene, at a first resolution, combined with video pass-through of the pixels of the user's hand 15 of the captured frame image of the ambient environment, at a second resolution, overlaid on a hand mask 175 (FIG. 1D). The user's hand 15 is combined if the hand overlaps the chromakey mask. The first resolution is higher than the second resolution. The composite MR scene 220 is created during a simulation using an interactive mixed masking (IMM) system 148 (FIG. 1D) to perform the IMM method 448 (FIG. 4B). Before proceeding with the description of the method 400 further, the IMM method 448 of FIG. 4B will be described.

The IMM method 448 may include, at block 450, controlling, by at least one processor, a device 150, which includes a tactile touch-sensitive surface (TTSS) 152 and a touch-sensitive input (TSI) circuit configured to sense a touch applied to the TTSS 152 by a user's hand at a location on the TTSS 152. The controlling, at block 450, to cause pixels of the TTSS of the device 150 to, during a simulation, display a non-simulated chromakey mask 152' (FIG. 1D) and to map the pixels of the chromakey mask to the TSI circuit and to virtual user-interactive simulator (VUIS) controls (FIG. 1D) associated with the simulation. The VIP overlay template 160 (FIG. 1A) may include the VUIS controls to interact with the simulation. The IMM method 448 may include, at block 452, detecting, by the at least one processor, pixels of the user's hand 15 and the pixels of the chromakey mask 152' in a captured frame image of an ambient environment during the simulation. The frame image is captured by the at least one camera at a second resolution.

The IMM method 448 may include, at block 454, rendering, by at least one processor, a final VR-CGS image 100", as seen in FIG. 1F. The final VR-CGS image 100" may be rendered by rendering first VR pixels representative of the VUIS controls overlaid on and aligned with the detected pixels 156 of the chromakey mask in the captured frame image, at block 456. The first VR pixels may include a first portion of VR pixels including pixel content representative of at least one of a gauge and an indicator. The first VR pixels may include a second portion of the first VR pixels representative of the VUIS controls. As a result of the simulation, the gauge or indicator may change as a function of the simulated vehicle operation. The first portion and the second portion of the first VR pixels form a virtual interactive instrumentation panel so that a user can interact with the simulation.

The final VR-CGS image 100" (FIG. 1F) may skip rendering of second VR pixels representative of a hand or camera-view mask 175 which overlap and align with detected pixels of the user's hand or other object overlapping a portion of the chromakey mask 152' in the captured frame image, at block 458. In operation, the at least one camera captures in the captured frame image of a user's hand, if the user's hand is within the FOV. The process would be able to detect each hand, arm or other object simultaneously intersecting with the mask 152' since only those pixels that pass the chromakey test are included in the final VR scene. There is no need to "repeat" this process per hand/real-world-object.

This would be repeated for each camera and/or for each final VR scene. It would be repeated once for each scene/camera pair in the standard stereo camera use case (e.g., the stereo rendering case) the left eye scene would mask against left camera and right eye scene against right camera, so only one camera per scene.

The final VR-CGS image 100" may be rendered by rendering third VR pixels representative of a simulator CPI 141 with at least one window of a vehicle, at block 460. The final VR-CGS image 100" may be rendered by rendering fourth VR pixels representative of at least one out-the-window (OTW) scene 142 mapped to the at least one window of the vehicle, at block 462.

However, in some embodiments, separate scenes/views mapped to the windows of the OTW are not required. The vehicle cockpit and the OTW scene may all be part of one collective scene (i.e., VR-CGS image 100). Sometimes, rendering may be performed on the separate scenes/views in separate passes. Then bits can be masked out to save on work, but the FOV and viewpoint, etc., are identical.

Returning now to FIG. 4A, the method 400 may include, at block 406, displaying the composite MR scene on an HMD apparatus 110, as best seen in FIG. 2. The HMD apparatus may display the composite mixed reality scene near to eyes of the user. During the simulation, the method 400, may include, at block 408, determining whether data representative of a touch on the TTSS 152 by the user's hand 15 corresponding to interaction by the user with a respective one VUIS control is received. If the determination is "YES," at block 408, then the method 400 may include altering a simulated operation of a vehicle in response to the received data wherein altering the simulated operation includes modifying the VR-CGS image 100 to update at least one of the first VR pixels and the fourth VR pixels, at block 410. The data or sensor signals representative of the touch may be generated by the TSI circuit. The TSI circuit may generate data or sensor signals representative of a sensed location associated with the touch by the user's hand to the TTSS indicative of an interaction with a respective one VUIS control.

At block 412, a determination may be made whether movement of the user's head is determined. The movement may be determined if there is a change in at least one of a position and location of a head of a user tracked by a head tracker or camera tracker. The head tracker and camera tracker may both be referred to as a location tracker. If the determination at block 412 is "YES", the method 400 may alter a simulated operation of the simulated vehicle in response to received data (head tracking information). The altering, at block 414, may include updating at least one of the first VR pixels, second VR pixels, third VR pixels and the fourth VR pixels, at block 414. Additionally, when altering the simulated operation of the vehicle, the interaction with the respective one VUIS control, based on receipt of the sensed location from the TSI circuit, may be determined. The determined interaction may cause altering at least one of the first portion of the first VR pixels and the fourth VR pixels. However, the second portion of the first VR pixels are may not be altered except for perspective adjustment based on 3D modeling relative to the user's head position and orientation or direction of gaze. The pixel content of the third VR pixels and fourth VR pixels may be updated based on the simulation and one or more of a determined simulated orientation and position of the vehicle, and the tracked location of the user's head.

From block 414, the IMM method 448 loops back to block 402 for continued simulation operations. Furthermore, if the determination at block 412 is "NO," the IMM method 448 loops back to block 402 for continued simulation operations. Returning to block 408, if the determination is "NO," the method loops to block 412.

The embodiments herein provide a TTSS or a tactile user input interface (TUIT) in the ambient environment. Touch-screen devices are display devices which display directly on the screen icons, tabs, buttons and other indicators to allow the user to navigation and control a program using the application of a touch on the touchscreen as an input, in a normal mode of operation. However, in a simulation mode, the TTSS of the display device 150 is used as a tactile user input interface and a non-simulated chromakey mask. The mask removes non-simulated display content so that displayed text for navigation, control and instrumentation can be overlaid on the TUIT with VR text to improve the resolution of the text in a mixed reality simulation environment. The improved resolution of the VR text is based on a variety of factors. One of the improvements is that the VR text is simulated and not subject to blurring, glare, lighting conditions, shading, etc., as would the imaged text being displayed on the TTSS.

As described above in relation to FIGS. 3A and 3B, other chromakey masks 379A, 379B or tape may be in the ambient environment. The chromakey masks 379A, 379B static and not digital. The color of chromakey masks 379A, 379B may differ from one another. The color of chromakey masks 379A, 379B may differ from the color of chromakey mask 152'. In some embodiments, the IMM method 448 would detect the chromakey masks 379A, 379B and provide the VR text associated with such masks.

Configuration Process

Figure 5:
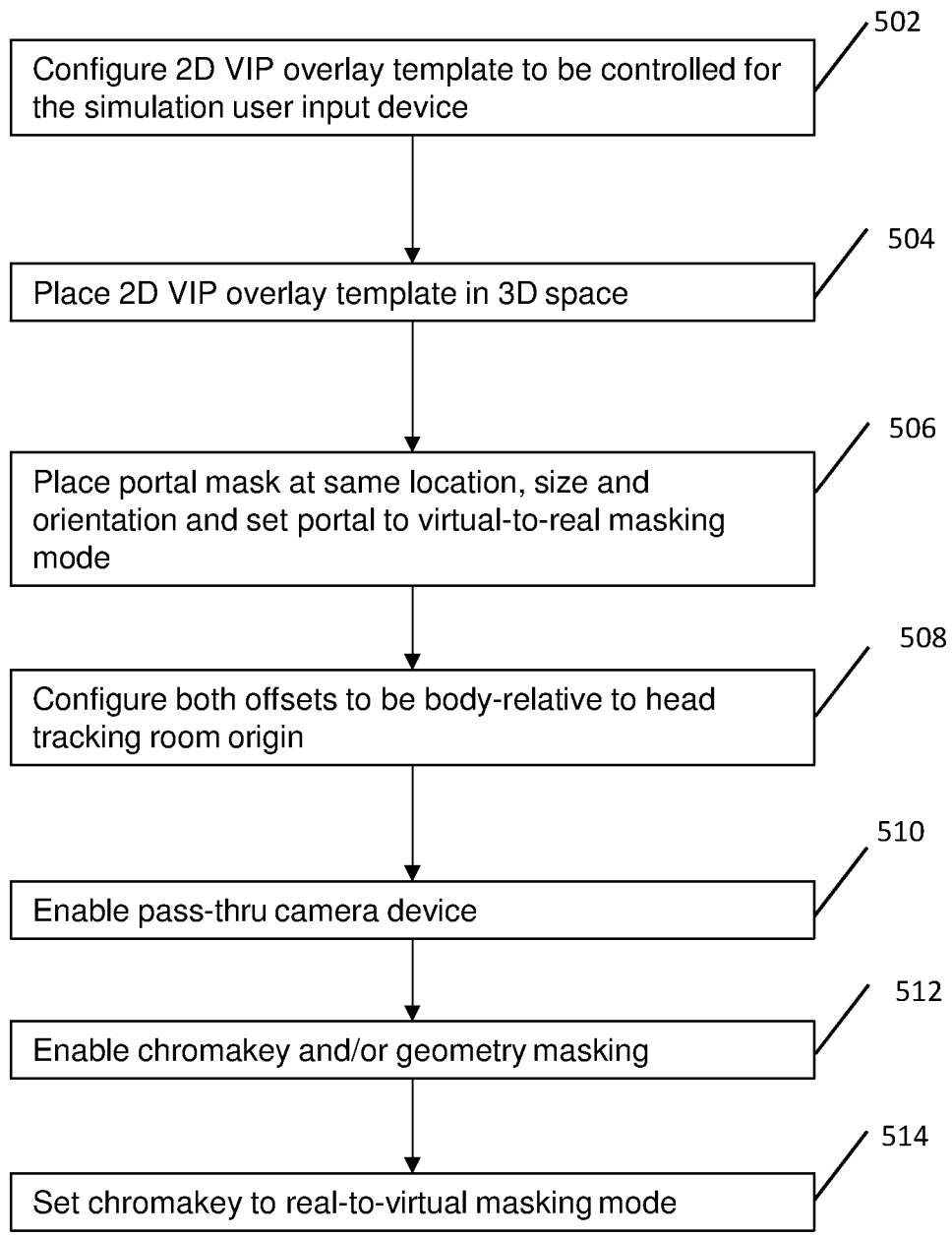
FIG. 5 illustrates a flowchart of a method for configuring the interactive mixed masking process.

FIG. 5 illustrates a flowchart of a method 500 of a configuration process for the interactive mixed masking (IMM) module 348 or IMM system 148 during a simulation. The FIG. 5 will be described in relation to FIG. 1A.

The method 500 may include, at block 502, configuring, by at least one processor of a computing system 105 or 305, a two-dimensional (2D) VIP overlay template 160 (FIG. 1A) or user interface of a VR-CGS image 100 to be controlled by touch through a real or tactile touch-sensitive surface (TTSS) 152. The TTSS display device 150 (FIG. 1C or 3A) is configured to provide a user interface or real tactile input device to enter inputs during the interaction of the user with the simulation system 300A (FIG. 3A).

At block 504, of method 500 may include placing the two-dimensional (2D) VIP overlay template 160 in 3D space for use in the 3D VR-CGS image 100. The VIP overlay template 160 is placed in 3D space so that the control buttons and gauges may appear as 3D objects in the composite MR final scene 220. The 3D space may place the VIP overlay template 160 in the 3D VR-CGS image 100.

The individual gauges and buttons are drawn in a two-dimensional (2D) image which are included in the touch screen display, so even in the real world these items (i.e., gauges and buttons) are 2D. However, the 2D image may contain shading to make buttons and gauges looked raised when viewed from directly above to effectuate a 3D appearance.

Referring also to FIG. 1D, at block 506, the method 500 may include placing portal mask 155 at same location, size and orientation of TTSS 152 of the display device 150 in the focal point of the HMD apparatus. In some embodiments, the relationship of the user relative to the display device 150 may be derived by the 3D VR-CGS image 100. In the example, the user may be sitting in proximity to the display device 150 by some set perspective and orientation. For example, in some embodiments, the user may sit directly in front of the display device 150. In other examples, the display device 150 may be to a side of the user. In the illustration of FIG. 3B, the display device is between two users. The relationship of the display device 150 is modified generally by movement of the user and user's head. The system may adjust for a derived user gaze in addition to the location of the user's head or camera.

The portal mask 155 is configured from an initial RT-CV image data which sets the portal to the touch-sensitive circuit to a virtual-to-real masking mode. This may allow the IMM module 348 to extract the virtual pixels 175 from the chromakeyed pixels 156 in the received camera-view image. At block 508, the method 500 may include configurating both offsets to be body-relative of user 10A (FIG. 3B) to head tracking room origin. In other words, an image perspective of virtual instrumentation panel device 130 (FIG. 1A) would be a function of the tracked user's head relative to a position and orientation of the vehicle, such as when the user turns their head up, down, left or right. The perspective of the text in text fields and the perspective of the controls would change based on the 3D VIP overlay template 160. The portal mask 155 and 3D VIP overlay template 160 are adjusted to the view point of the viewer (user). An offset may be in a horizontal dimension, vertical dimension or both the horizontal and vertical dimensions. In some embodiments, a room in which the user performs the simulation via simulator system 300A (FIG. 3A) may include an additional head tracking system to track the head of the user in addition to a head-worn location tracker 117.

This is what allows identification of the pixels in the RT-CV image that may contain pixels 156 of the TTSS mask or pixels 175 of the camera-view mask as stated in the paragraphs above. Virtual-to-real means that all pixels inside/part-of the portal mask are considered part of real world should proceed to be process the RT-CV image to get their final value and/or isolate pixels 156 of the TTSS mask from pixels 175 of the camera-view mask.

Setting the chromakey mode to real-to-virtual means that all RT-CV image pixels that match the chromakey color comprise a portal back into the virtual world, meaning these pixels are not included in the final image. This is what allows the green or chromakey colored pixels to be removed so that the VIP overlay template included in the VR-CGS may be isolated.

At block 510, the method 500 may include enabling a pass-through camera device (i.e., camera device 115). At block 512, the method 500 may include enabling chromakey and/or geometry masking. At block 514, the method 500 may include setting the chromakey mask of the TTSS 152 to real-to-virtual masking mode to form the virtual interactive panel overlay instantiation (VIP-OI) image 165 (FIG. 1F).

Final Virtual Scene Rendering

Figure 6:
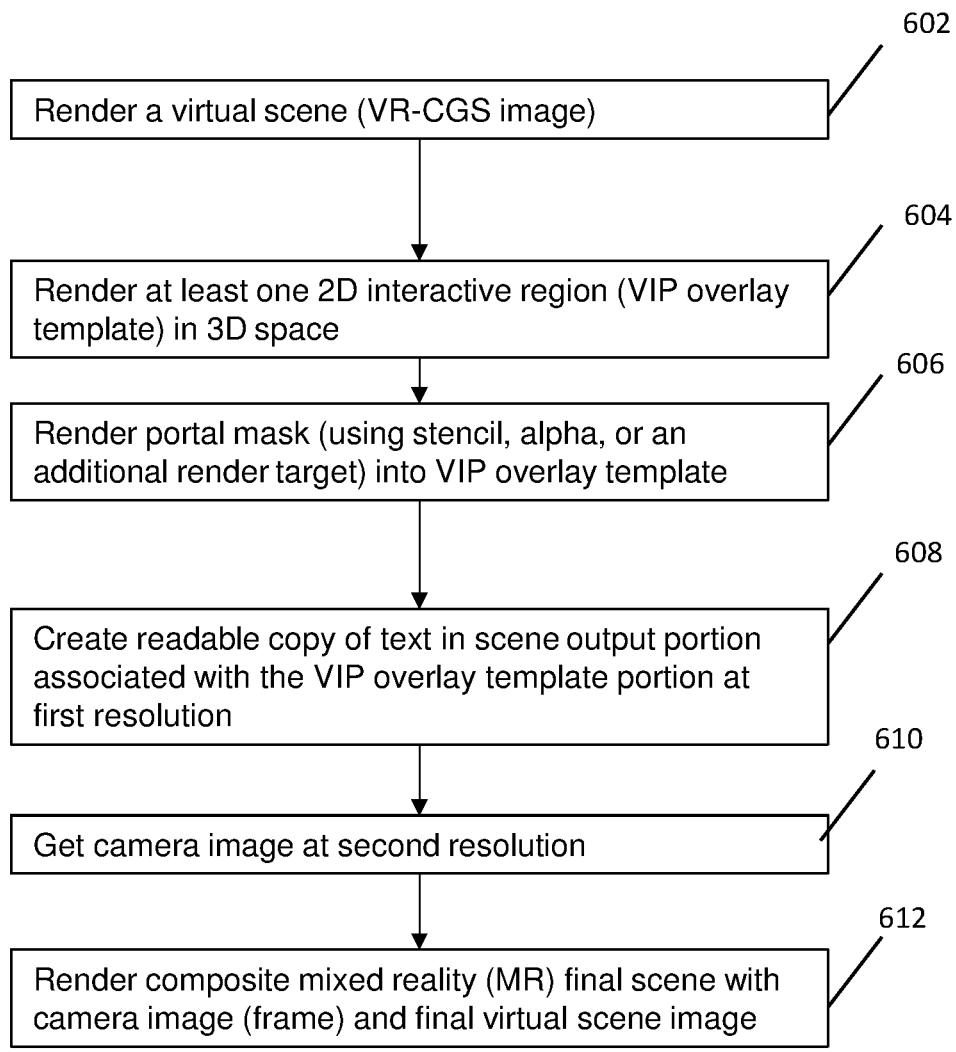
FIG. 6 illustrates a flowchart of a method for rendering the final virtual scene for use in the interactive simulation.

FIG. 6 illustrates a flowchart of a method for rendering the final virtual scene (i.e., final VR-CGS image 100") for the interactive simulation. The flowchart of FIG. 6 is directed "rendering," at block 424 of FIG. 4B, as applied to the HMD apparatus. The method 600 will be described in relation to FIGS. 1A-1F. A representative final virtual scene is depicted in FIG. 1F. The method 600, at block 602, may include rendering an initial virtual scene image (i.e., VR-CGS image 100), as best seen in FIG. 1A, for the simulation. FIG. 1A includes data representative of a VR-CGS image 100 (simulated) which is stored in memory and not yet displayed on any display. This data is rendered so that the VR-CGS image 100 can be displayed and registered to the lenses 112 or display of the HMD apparatus 110, as part of the composite mixed-reality final scene 220.

At block 604, the method 600 may include rendering a 2D interactive region (i.e., VIP overlay template 160) in 3D space. The interactive region corresponds to the TTSS for the user input interface. At block 606, the method 600 may include rendering a portal mask 155 (using stencil, alpha, or an additional render target) into the interactive region (i.e., VIP overlay template 160). The portal mask 155 is configured to be registered to the non-simulated chromakey mask 152' of FIG. 1D displayed directly by the TTSS 152 to the VR-CGS image 100. The portal mask 155 sets the virtual pixels 175 to a second mask value, for example, to register to and align with those imaged pixels in the chromakey (non-simulated) mask 152' being obscured by a user's hand/extremity 15. The chromakey masking pixels 156, of the portal mask 155, are set to the first mask value different from or distinguishable from the second mask value. The chromakey masking pixels 156 are identified as corresponding to the camera-view chromakey colored pixels (non-simulated) of the chromakey mask 152' and are not obscured by the user's hand/extremity in a captured camera frame image.

At block 608, the method 600 may include creating readable copy of a virtual scene output (i.e., virtual interactive panel overlay instantiation (VIP-OI) image 165) for an instantiation of the simulation in real time. The VIP-OI image 165 includes high resolution pixels of the VIP overlay template 160 which are identified as aligning or overlapping with the masking pixels 156 of the portal mask 155 to form VIP overlay template portion 160' (FIG. 1D). The virtual-reality computer-generated scene (VR-CGS) image 100" (FIG. 1F) or final virtual scene output includes those pixels of the virtual interactive panel overlay instantiation (VIP-OI) image 165 as a substitution for the VIP overlay template 160 of FIG. 1A in the initial VR-CGS image 100. The VIP overlay template 160 may include computer generated VR text of higher resolution not subject to ambient conditions.

In a camera image, the boundaries of the chromakey mask 152' can be easily identified by testing pixel color of pixels in a captured frame image. In some embodiments, the boundary of the mask 152' in the camera image may be determined in part by the pixel resolution size of the detected display device 150.

At block 610, the method 600 may include getting, in an FOV of a head-worn camera device, a camera frame image of at least one of the user's hands 15 and the chromakey mask 152' at a first resolution. At block 612, the method 600 may include rendering the composite MR final scene 220 or 320 including the final pass-through image and the VR-CGS image 100" (FIG. 1F) wherein pixels of the real-time image of the user's hands 15 or other object from the camera device corresponding to the camera-view or the hand mask 175 are the only pixels preserved from the camera-view image for the creation of the pass-through image. The VR-CGS image 100" (FIG. 1F) is a final (rendered) virtual scene. The processes for rendering the composite MR final scene 220 or 320, will be described in more detail in relation to FIG. 7.

The composite MR final scene 320 may include hands of two users within an FOV of the camera device associated with a respective HMD apparatus. In a multi-user environment, a head-worn camera device of one user may capture at least one hand of an adjacent user participating in the simulation. Thus, the VR-CGS image 100" for a two-person embodiment may have multiple hand in the camera view, each associated with a respective user or different users. When processing the camera view, the pixels are identified accordingly.

Blocks 610 and 612 overlap with blocks 402 and 404, respectively.

Rendering the Final MR Composition

Figure 7:
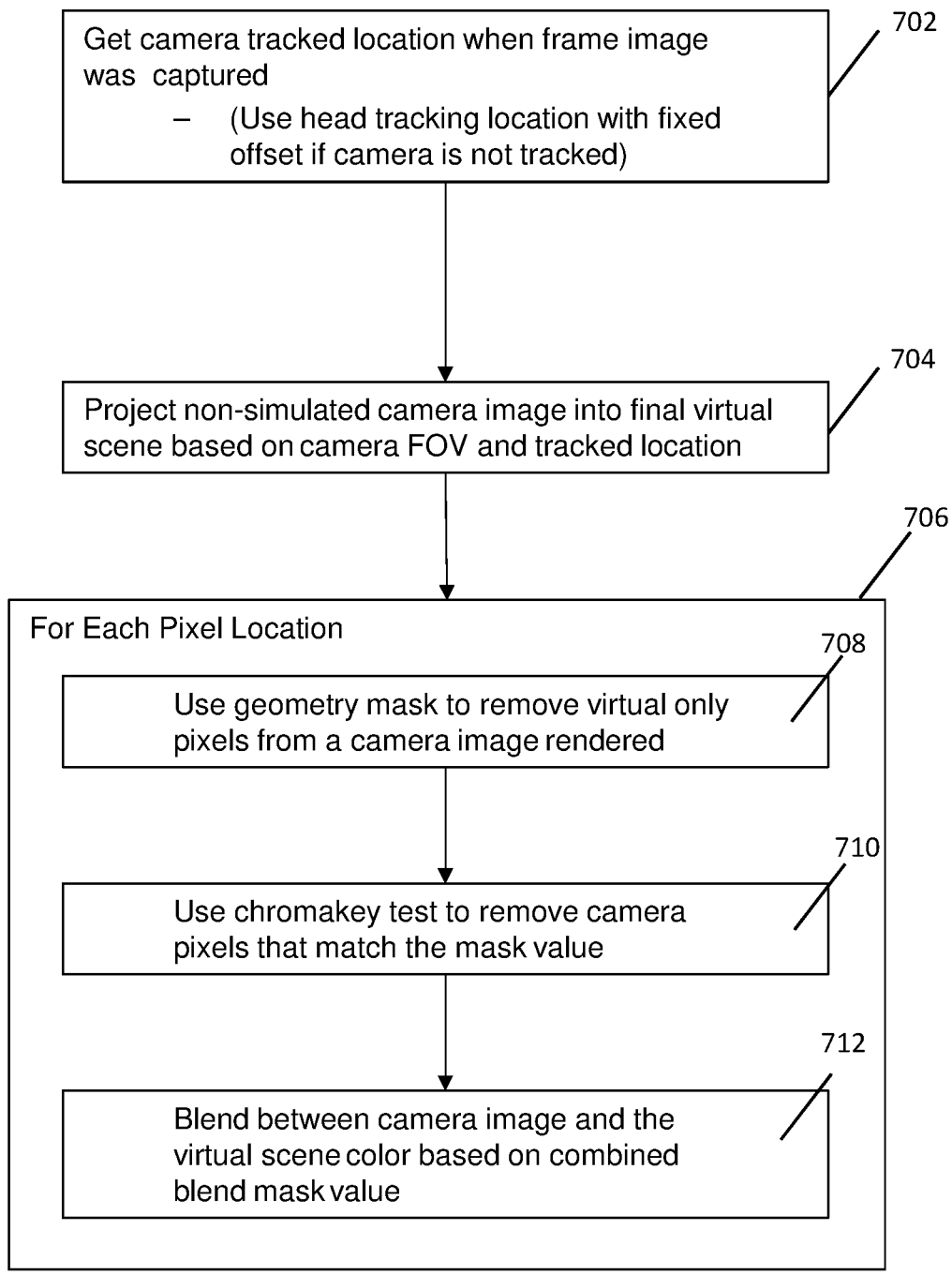
FIG. 7 illustrates a flowchart of a method for rendering the composite mixed-reality (MR) final scene for the interactive simulation.

FIG. 7 illustrates a flowchart of a method 612 for rendering the composite mixed-reality final scene 220 or 320 during a simulation. The method 612 includes processes for performing the rendering of the composite mixed-reality final scene from a pixel-by-pixel aspect. The method 612 for rendering the composite mixed-reality final scene may include, at block 702, getting camera tracked location when an instant video frame image was captured by the at least one camera device 115. Alternately, at block 702, the method 612 may include using a head tracking location with a fixed offset relative to the camera, if the location of the camera device is not directly tracked.

At block 704, the method 612 may include projecting the camera frame image into final virtual scene based on the camera's FOV and tracked location of the head or camera. At block 708, the method 612 may include, for each pixel location, using a geometry mask to remove virtual-only pixels from a camera image render. In other words, for a current camera frame image, those pixels outside of the boundaries of the chromakey mask 152' may be isolated and discarded, in some embodiments. Those pixels within the boundary of the chromakey mask marry an interactive virtual overlay template to a touch-sensitive circuit for user input.

At block 710, the method 612 may include using a chromakey pixel test to remove camera pixels that match the first mask value from the camera-view image (frame image). In other words, the non-simulated chromakey mask 512' mapped to the pixels 156 needs to be removed prior to combining the camera frame image and final virtual scene. At block 712, the method 612 may include combing a camera image with the non-simulated hand/extremity camera image pixels remaining and the final virtual scene. In other words, the camera image is spliced into the final virtual scene. The pixels outlining the camera image when sliced into the final virtual scene may be blended with a color based on a combined blend mask value. The blocks 708, 710 and 712 are repeated in block 706 for each pixel location of the camera frame image to form the composite mixed-reality final scene 220 or 320.

The method may determine for each pixel in the final virtual scene what corresponding location in the camera image should be shown. The method may then sample values from the image using blending hardware to get a final color. The camera image does not match the virtual scene image in resolution. The camera image is projected onto a plane into 3D such that it looks correct.

As can be appreciated, the method of FIGS. 6 and 7 describes a process of splicing the non-simulated camera frame image associated with a single hand/extremity or other object. However, in some embodiments, the method may be used to detect more than one hand/extremity in the FOV of the camera which overlaps the chromakey mask 512'.

The embodiments described above allows the user to interact with a simulator using a tactile user input interface without the need for special gloves being worn by the user which can affect the ability of the TTSS to sense a touch through the electrical/mechanical touch-sensitive circuit.

While the description herein describes forming a real chromakey touchscreen display device to improve the text resolution or quality in MR scenes, other touch-sensitive devices, such as keyboards, in a captured image with text associated with specific locations may be turned into a chromakey keyboard so that the imaged text having a first resolution of each key of the keyboard can be enhanced with the substitution of VR alphanumeric characters of a second resolution mapped to the keys of the keyboard. This allows a user to type on a real keyboard having the natural/expected touch and feel with the non-simulated text (alphanumeric characters) on the keys replaced with higher resolution VR alphanumeric characters not subject to lighting, shading, blurring, and contrast imaging factors.

Virtual Glass Touch Input Device

Figure 8A:
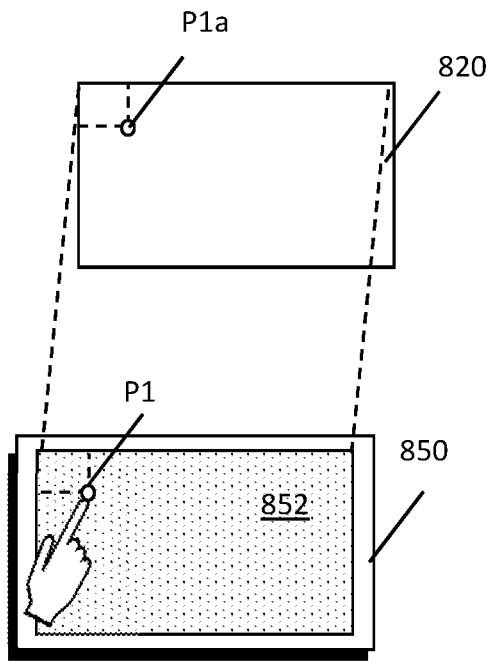
FIGS. 8A-8E illustrate diagrams of a virtual glass display device.

FIGS. 8A-8E illustrate diagrams of a coordinate system transformation required to simulate a virtual glass touch input device 820. The virtual glass touch input device 820 will sometimes be referred to as a virtual glass panel surface 820. The virtual glass panel surface 820 is a simulated 2D surface which is placed in the 3D scene but remains invisible to the user. The purpose of the virtual glass panel is to serve as a coordinate space for mapping touch input into the virtual environment. In FIG. 8A, a touch-sensitive surface 852 of a display device 850 is shown. In the example, the point of touch P1a is generated on the virtual glass panel. In a touchscreen-type display device 850, the user touches a point P1 on the touch-sensitive surface 852. If the touch-sensitive circuit 852 (FIG. 8A) of the display device 850 senses a touch at point P1, such sensed point P1 may be recognized by a computing system as being associated with a point P1a on the virtual glass panel surface 820. From a hardware perspective, the virtual glass touch input device is identical to the touch-sensitive display used in the embodiment of FIG. 1C. The difference in embodiments is how the input is processed using information about the user's viewpoint and the location of the virtual glass panel surface 820.

Figure 8B:
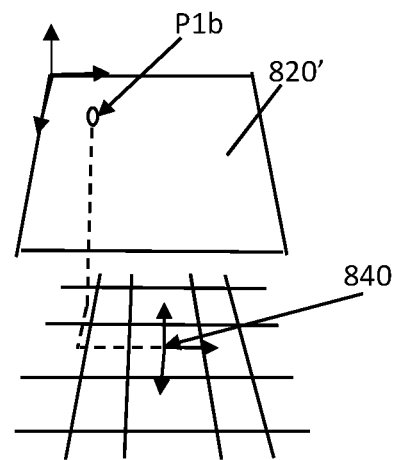

In FIG. 8B, the virtual glass panel surface 820' is translated within the simulation relative to a coordinate system 840. This could be any reference origin such as the origin of a tracking system, or a simulated aircraft's center of mass. However, the point P1b needs to be determined, as described in relation to FIG. 9. The virtual glass panel surface 820' is represented as a panel in 3D space and is used to transform a point into the space associated with the coordinate system 840 (block 904 of FIG. 9).

Figure 8C:
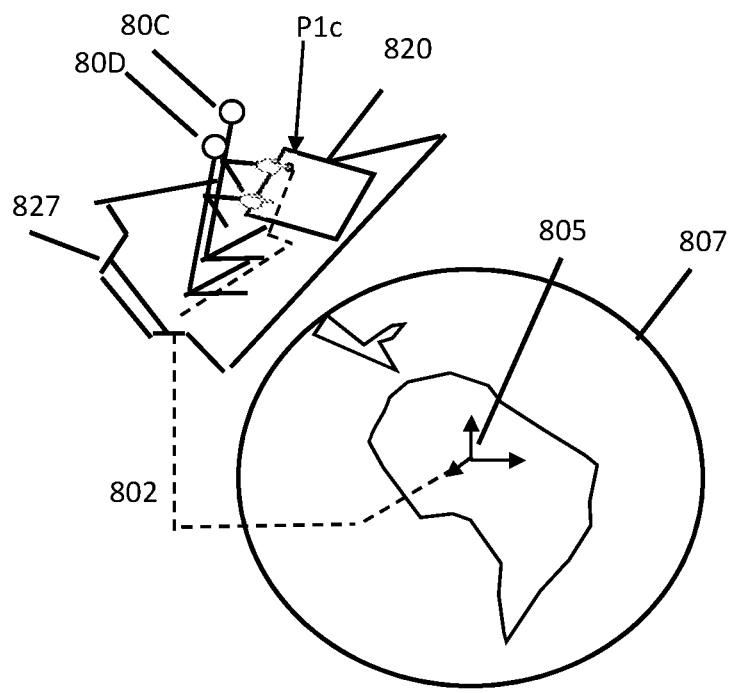

FIG. 8C shows the full earth coordinate system. The earth 807 is denoted as a circle. The center of the earth which serves as the coordinate reference is denoted as reference numeral 805. The virtual pilots 80C and 80D may represent where each the real-world user's avatar would be in the virtual world. The box denoted by the reference numeral 820 is representative of the 2D virtual panel placed in 3D space, or the location of the virtual glass touch display device 820. The tracking system origin is anchored to point in the real world relative to the touch display and other physical controls. Offsets relative to the tracking space can only be applied after first applying the world offsets for the virtual aircraft 827 having parameters latitude, longitude, altitude, pitch, bank, and heading. This is shown by way of non-limiting example. Any number of complex coordinate transformations may be required depending on parameters of the simulation. The end result of all these transformations is the final point P1c which has a location relative to the full earth, denoted by the dashed line 802.

A custom full earth coordinate system may be used on the GPU 1050 (FIG. 10) so that all scene elements and the camera can be placed relative to the center of the earth. Thus, some specifier "in a full earth simulation" may be tacked on to the coordinate system.

Figure 8D:
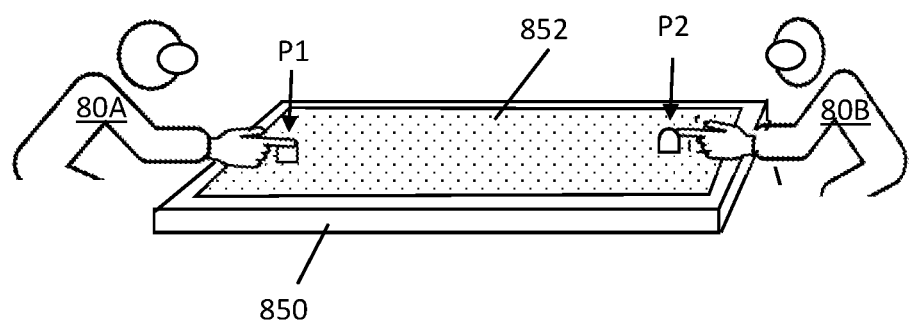

In FIG. 8D the real-world representation of a virtual glass touch input device is shown being used by two users 80A and 80B wearing HMD apparatuses. Each user touches a point on the touch sensitive circuit 852. The touch points are represented as P1 and P2.

Figure 8E:
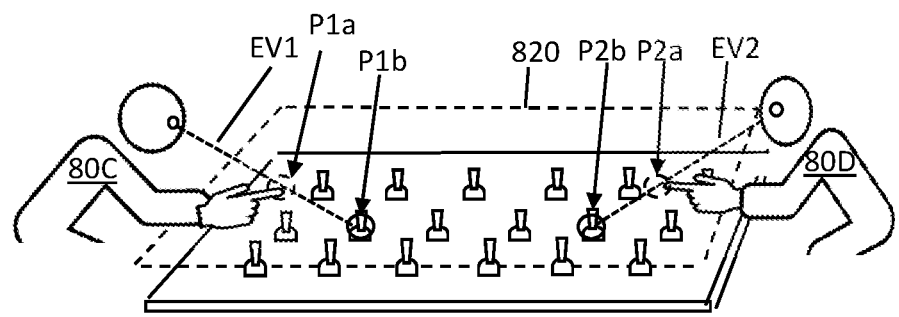

FIG. 8E illustrates the simulation and VRCG scene representation of the same scenario depicted in FIG. 8D. The virtual glass panel surface 820 is bit visible to the user which is indicated by the dashed outline. The point P1a (world-space point) is transformed into user eye-view screen-space along eye view lines (EV1) of user avatar 80A. The point P1a is from the perspective of a first user avatar 80C. The point P2a (world-space point) is transformed into user's eye-view screen-space along eye view lines (EV2) of user avatar 80B. The point P1a is then transformed back into world space by projecting the point along lines EV1 though the virtual glass panel surface 820 and finding the intersection with the geometry in the virtual scene to generate point P1b. The same is done for the second user. The point P2a is then transformed back into world space by projecting the point along lines EV2 though the virtual glass panel surface 820 and finding the intersection with the geometry in the virtual scene to generate point P2b.

As a result, the touch event is processed by the simulation at a location behind the glass from the perspective of each user. The transformation may compensate for parallax offsets.

The real touch input device would be green and work the same way it does when using a VIP overlay. A portal/ geometry mask object is used at the matching location so that users sees their hands when their hands in front of the green touch screen.

The difference is that some embodiments do not actually display a textured 3D object for the VIP overlay with an image of buttons. It's invisible. The invisible VIP overlay object is the "virtual glass" because the user can see through the VIP overlay. In this embodiment, there is a 3D virtual model with 3D buttons and switches behind the virtual glass, such as shown in FIG. 8E. When a user reaches out for a switch, they see their real hand, and the virtual switches (because again chromakey and portal masking are used). Just before their hand should hit the switch, it hits the real touch screen. The user cannot see a touch screen, but they feel the glass when their finger hits.

Figure 9:
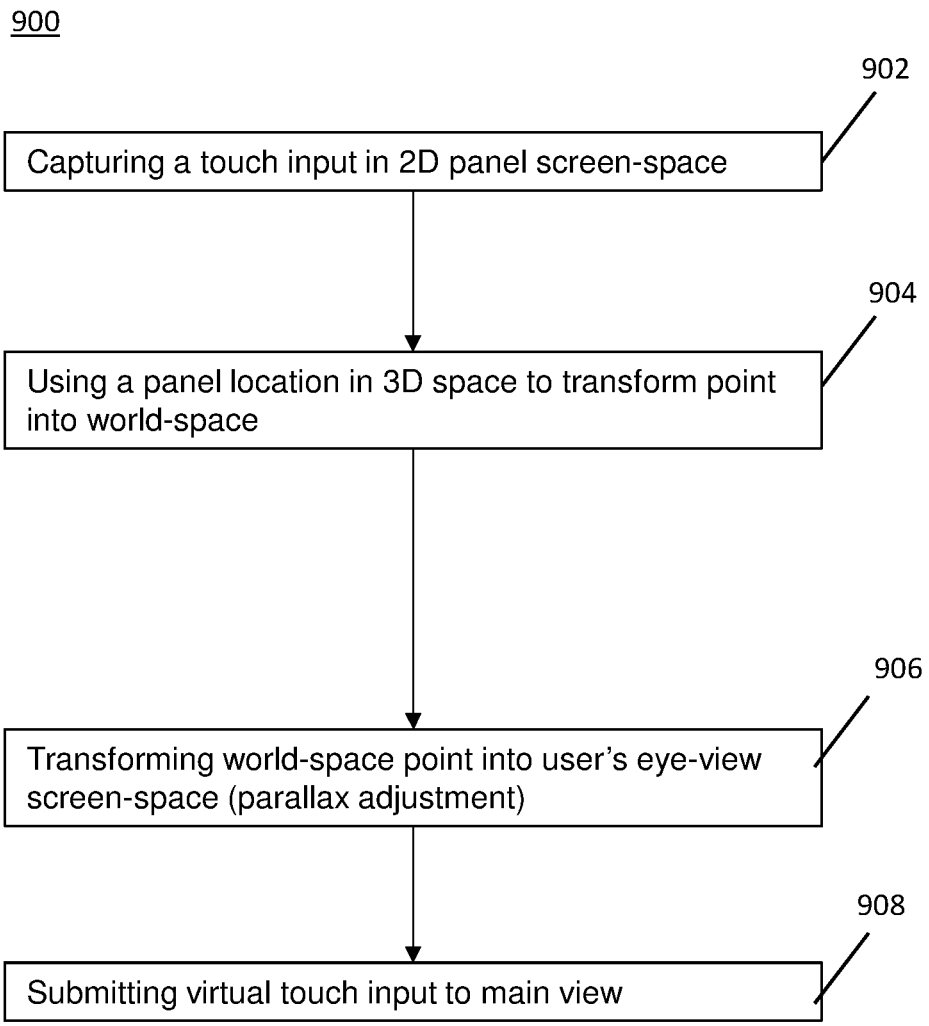
FIG. 9 illustrates a flowchart of a method for determining a user input using a circuit-less glass substrate.

FIG. 9 illustrates a flowchart of a method 900 for determining a user input using a circuit-less glass substrate (i.e., virtual glass display device 820). The method 900 for virtual glass touch overlay may include, at block 902, capturing a touch input in 2D panel screen-space using the virtual glass display device 820. At block 904, the process 900 may include using a panel location in 3D space to transform a point into world-space. At block 906, the process 900 may include transforming world-space point into user's eye-view screen-space (FIG. 8E). In the embodiment of FIG. 8C, two users are interacting with the virtual glass display device. Thus, the transforming the world-space point into the user's eye-view screen space may include adjusting for parallax for each user. At block 908, the process 900 may include submitting virtual touch input to main view.

The main view is the 3D virtual scene (FIG. 1A) from the perspective of the left eye. This is the view that is displayed on a primary monitor connected to the PC. Because it is displayed in the simulation application window, it can take user input via mouse or touch. That input is translated into a screen-space ray and cast into the VR scene. This may be done for ease of implementation if the application already has a workflow for creating ray casts based on an on-screen pixel location. In operation, a ray is casted from the eye of a user to the touch point on the input device (virtual glass display device 820). That ray then extends into the VR scene and can trigger interactions with anything it intersects.

The virtual glass display device is rendered a touch-sensitive surface or user touch input interface without the need for a touch-sensitive circuit.

Computational Hardware Overview

Figure 10:
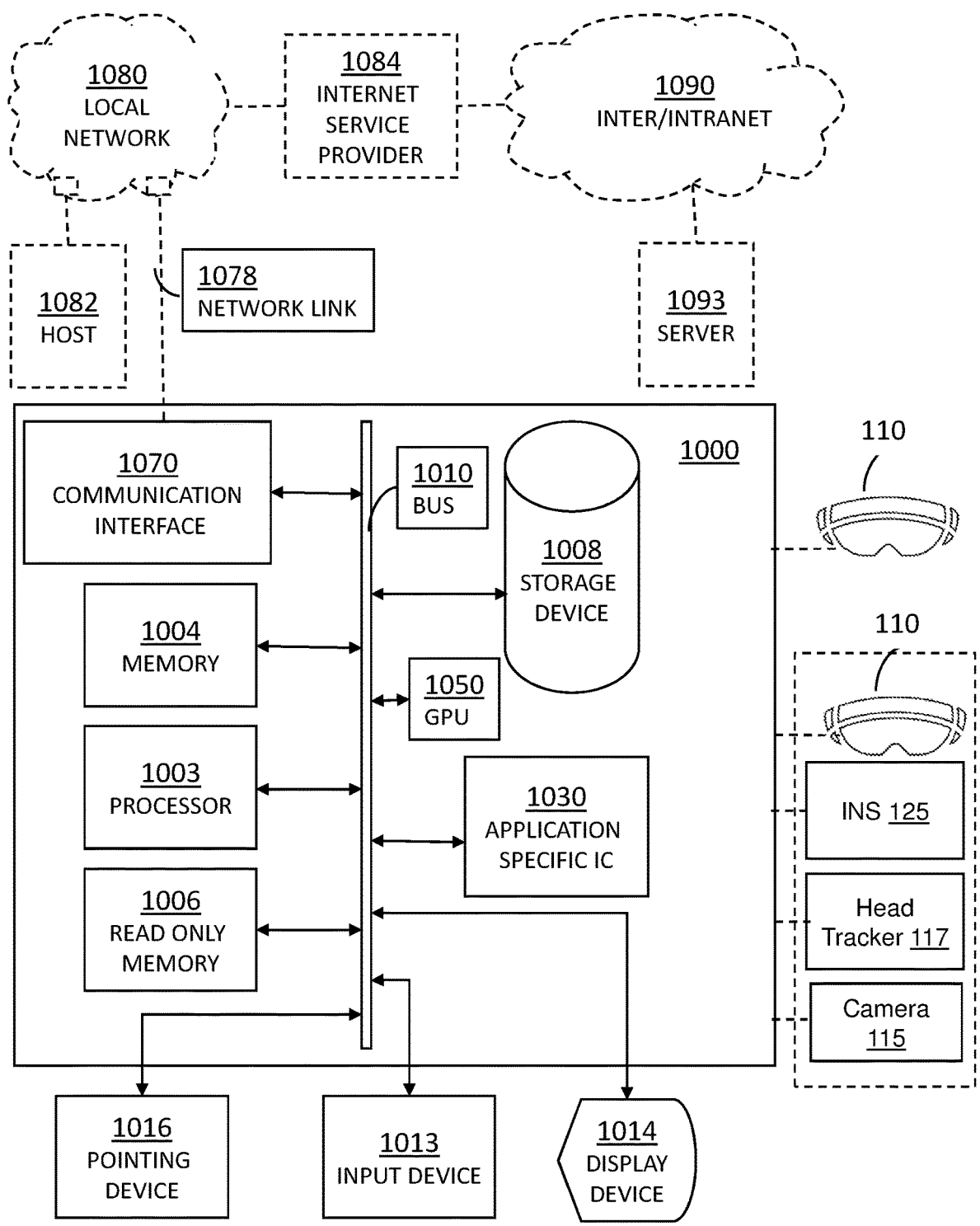
FIG. 10 illustrates a block diagram of a computing system.

FIG. 10 is a block diagram that illustrates a computer system 1000 (i.e., computing system 105) upon which an embodiment of the invention may be implemented or employed. The terms computing system and computer system are used interchangeably herein. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more blocks of one or more methods described herein. Thus, the computer system is a special purpose computer system.

A sequence of binary digits constitutes digital data that is used to represent a number or code for a character. A bus 1010 includes many parallel conductors of information so that information is transferred quickly among devices coupled to the bus 1010. One or more processors 1003 for processing information are coupled with the bus 1010. A processor 1003 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1003 constitutes computer instructions. A graphics processing unit (GPU) 1050 may be coupled to bus 1010.

Computer system 1000 also includes a memory 1004 coupled to bus 1010. The memory 1004, such as a random access memory (RAM) or other dynamic storage device, stores information including computer instructions. The memory 1004 may also include dynamic memory which allows information stored therein to be changed by the computer system 1000. RAM allows a unit of information stored at a location called a memory address to be stored and retrieved independently of information at neighboring addresses. The memory 1004 is also used by the processor 1003 to store temporary values during execution of computer instructions. The computer system 1000 also includes a read only memory (ROM) 1006, non-volatile persistent storage device or static storage device coupled to the bus 1010 for storing static information, including instructions, that is not changed by the computer system 1000. The ROM 1006 may be a secure byte-addressable memory (storage) device or a direct-access for files (DAX) memory device. The bus 1010 may also have coupled thereto other storage devices including a non-volatile (persistent) storage device, such as a magnetic disk or optical disk, for storing information, including instructions, that persists even when the computer system 1000 is turned off or otherwise loses power.

Information, including instructions, is provided to the bus 1010 for use by the processor from an external input device 1013, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), light emitting diode (LED) displays, for presenting images, and a pointing device 1016, such as a mouse or a trackball or cursor direction keys, for controlling a position of a small cursor image presented on the display device 1014 (i.e., display device 150) and issuing commands associated with graphical elements presented on the display 1014.

In the illustrated embodiment, special purpose hardware, such as an application specific integrated circuit (IC) 1030, may be coupled to bus 1010. The special purpose hardware may be configured to perform operations not performed by processor 1003 quickly enough for special purposes. Examples of application specific ICs include graphics accelerator cards for generating images for display device 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. For example, the communication interface 1070 may interface with the inertial navigation system (INS) 125 whose signals may be used for camera tracking or head tracking via tracker 117. The INS 125 may include accelerometers and gyroscopes to track the position and orientation of the user's head or the camera. The INS 125 may include a GPS.

The communication interface 1070 may receive images from camera device 115. The camera device 115 may be in a camera pass-through mode. The communication interface 1070 may communicate with HMD apparatus 110 with at least one display screen or optical system mounted near to the eye of the user. Pointing device 1016, input device 1013 and display device 1014 may be associated with host computer 1082.

In general, the computer system 1000 through the communication interface 1070 may be coupled with a network link 1078 that is connected to a local network 1080 to which a variety of external devices with their own processors are connected. In some embodiments, the local network 1080 may be a private network and may include wired and/or wireless communications. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 may be a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1003, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1003, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1003, except for carrier waves and other signals.

Logic encoded in one or more tangible media includes one or both of processor instructions on a computer-readable storage media and special purpose hardware, such as ASIC 1030.

Network link 1078 typically provides information communication through one or more networks to other devices that use or process the information. For example, network link 1078 may provide a connection through a private or local network 1080 to a host computer 1082, such as a secure host computer. For example, in some embodiments, the pilot may be located at the host computer 1082. Thus, the user interfaces referenced in FIG. 10, may be located with the host computer 1082. The host computer 1082 may also update and/or control the simulation application 340 from a remote location based on user responses or training session trends, by way of non-limiting example. The host computer 1082 may also control or update the IMM module 348.

In some embodiments, the computer system 1000 may connect to equipment 1084 operated by an Internet Service Provider (ISP) or Intranet Service Provider. ISP equipment 1084 in turn provides data communication services through the public, world-wide packet-switching communication network of networks now commonly referred to as the Internet 1090 or alternately over an Intranet. A computer called a server 1093 connected to the Internet or Intranet provides a service in response to information received over the Internet or Intranet. For example, server 1093 provides information representing video data for presentation at display 1014 or the server may receive information representing video data.

The invention is related to the use of computer system 1000 for implementing the techniques described herein. According to one embodiment of the invention, those techniques are performed by computer system 1000 in response to processor 1003 executing one or more sequences of one or more instructions contained in memory 1004 to form a computer program product. Such instructions, also called software and program code, may be read into memory 1004 from another computer-readable medium such as storage device 1008. Execution of the sequences of instructions contained in memory 1004 causes processor 1003 to perform the method blocks described herein. In alternative embodiments, hardware, such as application specific integrated circuit 1030, may be used in place of or in combination with software to implement the invention. Thus, embodiments of the invention are not limited to any specific combination of hardware and software. Memory 307 of FIG. 3A may be embodied in one or more of memory 1004, read only memory 1006 or storage device 1008, for example, Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1003 as it is received or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1003 for execution. For example, instructions and data may initially be carried on a magnetic disk of a remote computer such as host computer 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1003 retrieves and executes the instructions using some of the data sent with the instructions. The instructions and data received in memory 1004 may optionally be stored on storage device 1008, either before or after execution by the processor 1003.

The memory 1004 may have stored thereon applications implemented as software or computer instructions. The applications when executed by the processor 1003 may perform one or more functions and steps as described herein.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
a device including a chromakeyed tactile touch-sensitive surface (TTSS) and a touch-sensitive input (TSI) circuit configured to sense a touch applied to the TTSS by at least one hand of a user at a location on the TTSS, the chromakeyed TTSS being chromakeyed by a non-simulated chromakey mask; and
at least one processor configured to execute a program code stored in a tangible, non-transitory memory to cause the at least one processor to:
register a location of the non-simulated chromakey mask, the device in a frame image of an ambient environment, and a virtual portal location within a virtual reality (VR) scene including virtual pixels of virtual user-interactive simulator (VUIS) controls;
detect and isolate within the non-simulated chromakey mask, in a current frame image of the ambient environment, first pixels having a non-chromakey color overlapping a portion of the non-simulated chromakey mask and second pixels matching a chromakey color of the non-simulated chromakey mask;
preserve the first pixels in the current frame image to form a camera pass-through image; and
form a composite mixed reality scene with the VR scene and the first pixels preserved in the current frame image to form the camera pass-through image, wherein virtual pixels of the VUIS controls corresponding to the first pixels are omitted from the VR scene and remaining virtual pixels of the VUIS controls overlap and link to the TSI circuit in the ambient environment.

2. The system of claim 1, wherein the virtual pixels of the VR scene are generated at a first resolution and the system further comprising:
a head tracker to track a position and location of a head of the user;
at least one video pass-through camera having a field-of-view (FOV) and being configured to capture the current frame image at a second resolution lower than the first resolution; and
a head-mounted display (HMD) apparatus in communication with the at least one processor, the HMD apparatus including:
at least one display configured to display the composite mixed reality scene near to eyes of the user.

3. The system of claim 2, wherein:
the first pixels include the at least one hand of the user in the current frame image;
the TSI circuit generates data representative of a sensed location associated with the sensed touch by the at least one hand of the user indicative of user selection of a respective one VUIS control; and
the at least one processor identifies the user selection of the respective one VUIS control based on receipt of the sensed location from the TSI circuit and alters display elements in the VR scene in response to the receipt of the sensed location.

4. The system of claim 2, wherein the HMD apparatus, the device and the at least one processor form a simulator and the device configured as a user input interface to control the simulator in response to the sensed touch of the at least one hand of the user.

5. The system of claim 1, wherein the at least one processor configured to execute the program code stored in the tangible, non-transitory memory to further cause the at least one processor to control the device to cause pixels of the TTSS to electronically display the non-simulated chromakey mask.

6. The system of claim 1, further comprising forming a portal mask registered to the non-simulated chromakey mask using one of geometric-based masking, chromakey-based masking, chromakey-based and geometric-based masking, and inverted chromakey-based and geometric-based masking.

7. The system of claim 1, wherein:
the TTSS is a tactile user input interface (TUIT) in the ambient environment;
the pass-through image includes only the first pixels; and
the at least one processor further configured to display on a head-mounted display apparatus the composite mixed reality scene, wherein the first pixels are non-simulated pixels representative of the at least one hand of the user.

8. A tangible, non-transitory computer readable media having program instructions stored thereon which when executed cause at least one processor to:
register a location of a non-simulated chromakey mask, a user touch input device in a frame image of an ambient environment, and a virtual portal location within a virtual reality (VR) scene including virtual pixels of virtual user-interactive simulator (VUIS) controls;
detect and isolate within the non-simulated chromakey mask, in a current frame image of the ambient environment, first pixels having a non-chromakey color overlapping a portion of the non-simulated chromakey mask and second pixels matching a chromakey color of the non-simulated chromakey mask;
preserve the first pixels in the current frame image to form a camera pass-through image; and
form a composite mixed reality scene with the VR scene and the first pixels preserved in the current frame image to form the camera pass-through image registered to the VR scene, wherein virtual pixels of the VUIS controls corresponding to the first pixels are omitted from the VR scene and remaining virtual pixels of the VUIS controls overlap and link to the user touch input device in the ambient environment.

9. The computer readable media of claim 8, wherein the pixels of the VR scene are generated at a first resolution and the computer readable media further comprising instructions which when executed cause the at least one processor to:
determine a position and location of a head of a user tracked by a head tracker;
receive from at least one video pass-through camera having a field-of-view (FOV) the current frame image at a second resolution lower than the first resolution; and
display on a head mounted display (HMD) apparatus the composite mixed reality scene near to eyes of the user.

10. The computer readable media of claim 9, wherein:
the first pixels include at least one hand of the user, interacting with the user touch input device, in the current frame image;
the user touch input device configured to generate data representative of a sensed location associated with the sensed touch by the at least one hand of the user indicative of user selection of a respective one VUIS control; and
the program instructions when executed further causes the at least one processor to identify the user selection of the respective one VUIS control based on determination of the sensed location relative to the user touch input device and alters display elements in the VR scene in response to the determined sensed location.

11. The computer readable media of claim 9, wherein the user touch input device comprises one of a touch-sensitive input device having a touch-sensitive surface and a virtual glass display device.

12. The computer readable media of claim 8, wherein the user touch input device comprises non-simulated pixels; and the at least one processor configured to execute the program instructions to further cause the at least one processor to control the user touch input device to cause the non-simulated pixels to electronically display the non-simulated chromakey mask.

13. The computer readable media of claim 8, wherein the program instructions which when executed further causes the at least one processor to form a portal mask registered to the non-simulated chromakey mask using one of geometric-based masking, chromakey-based masking, chromakey-based and geometric-based masking, and inverted chromakey-based and geometric-based masking.

14. The computer readable media of claim 8, wherein:
the pass-through image includes only the first pixels; and
the program instructions when executed further cause the at least one processor to display on a head-mounted display apparatus the composite mixed reality scene, wherein the first pixels are non-simulated pixels representative of at least one hand of a user interacting with the user touch input device through the remaining VUIS controls.

15. A method comprising:
capturing, by at least one camera, a frame image of an ambient environment;
registering, by at least one processor, a location of a non-simulated chromakey mask, a user touch input device in the frame image of the ambient environment, and a virtual portal location within a virtual reality (VR) scene including virtual pixels of virtual user-interactive simulator (VUIS) controls;
detecting and isolating, by the at least one processor, within the non-simulated chromakey mask in a current frame image of the ambient environment, first pixels having a non-chromakey color overlapping a portion of the non-simulated chromakey mask and second pixels matching a chromakey color of the non-simulated chromakey mask;
preserving, by the at least one processor, the first pixels in the current frame image to form a camera pass-through image; and
forming, by the at least one processor, a composite mixed reality scene with the VR scene and the first pixels preserved in the current frame image to form the camera pass-through image registered to the VR scene, wherein virtual pixels of the VUIS controls corresponding to the first pixels are omitted from the VR scene and remaining virtual pixels of the VUIS controls overlap and link to the user touch input device in the ambient environment.

16. The method of claim 15, wherein the pixels of the VR scene are generated at a first resolution and further comprising:
determining, by the at least one processor, a position and location of a head of a user tracked by a head tracker;
receiving, by the at least one processor, from at least one video pass-through camera having a field-of-view (FOV) the current frame image at a second resolution lower than the first resolution; and causing, by the at least one processor, on a head mounted display (HMD) apparatus, a display representative of the composite mixed reality scene near to eyes of the user.

17. The method of claim 16, wherein:

the first pixels includes at least one hand of the user, interacting with the user touch input device, in the current frame image; and the user touch input device configured to generate data representative of a sensed location associated with the sensed touch by the at least one hand of the user indicative of user selection of a respective one VUIS control; and further comprising:

identifying, by the at least one processor, the user selection of the respective one VUIS control based on determination of the sensed location relative to the user touch input device; and altering display elements in the VR scene in response to the determined sensed location.

18. The method of claim 15, wherein the user touch input device comprises non-simulated pixels; and the method further comprising:

controlling, by the at least one processor, the user touch input device to cause the non-simulated pixels to electronically display the non-simulated chromakey mask.

19. The method of claim 15, further comprising forming a portal mask registered to the non-simulated chromakey mask using one of geometric-based masking, chromakey-based masking, chromakey-based and geometric-based masking, and inverted chromakey-based and geometric-based masking.

20. The method of claim 15, wherein:

the camera pass-through image includes only the first pixels; and the method further comprising:

causing, by the at least one processor, a head-mounted display apparatus to display the composite mixed reality scene near to an eye of a user, wherein the first pixels are non-simulated pixels representative of at least one hand of the user interacting with the user touch input device through the remaining VUIS controls.

* * * * *